United States Patent
Liang et al.

(10) Patent No.: US 10,762,141 B2
(45) Date of Patent: Sep. 1, 2020

(54) USING ON-LINE AND OFF-LINE PROJECTIONS TO CONTROL INFORMATION DELIVERY TO MOBILE DEVICES

(71) Applicant: XAD, INC., New York, NY (US)

(72) Inventors: Can Liang, Sunnyvale, CA (US); Huitao Luo, Fremont, CA (US); Shashi Seth, Mountain View, CA (US); Hari Venkatesan, Cupertino, CA (US); Sunil Kumar, Brooklyn, NY (US)

(73) Assignee: xAd, Inc., New York, NY (US)

( * ) Notice: Subject to any disclaimer, the term of this patent is extended or adjusted under 35 U.S.C. 154(b) by 210 days.

(21) Appl. No.: 15/919,197

(22) Filed: Mar. 12, 2018

(65) Prior Publication Data

US 2018/0260393 A1    Sep. 13, 2018

Related U.S. Application Data

(60) Provisional application No. 62/470,119, filed on Mar. 10, 2017.

(51) Int. Cl.
  *G06F 17/00*    (2019.01)
  *G06F 16/93*    (2019.01)
  (Continued)

(52) U.S. Cl.
  CPC ............ *G06F 16/93* (2019.01); *G06F 16/951* (2019.01); *G06F 16/9537* (2019.01)

(58) Field of Classification Search
  CPC ..... G06F 16/93; G06F 16/9537; G06F 16/951
  See application file for complete search history.

(56) References Cited

U.S. PATENT DOCUMENTS

2008/0154915 A1   6/2008  Flake et al.
2012/0209706 A1*  8/2012  Ramer .................. G06Q 30/02
                                                         705/14.51
(Continued)

OTHER PUBLICATIONS

International Search Report and Written Opinion dated Jul. 9, 2018, received in International Patent Application No. PCT/US2018/022080, 11 pgs.

(Continued)

*Primary Examiner* — Tyler J Torgrimson
(74) *Attorney, Agent, or Firm* — Morgan, Lewis & Bockius LLP

(57) ABSTRACT

A system for processing information requests associated with mobile devices comprises an information server configured to build a search query for an information request based on the location features and other data therein and to search an information database for matching information documents. The matching information documents including information documents having different types of performance measure, including a first document using an impression-based performance measure, a second document using a click/call-based performance measure and a third document using an off-line site-visit-based performance measure. The information server is further configured rank the matching documents based on their respective performance measures and to select a matching document based on their respective rankings. The information server is further configured to generate a projected probability of an off-line site visit in response to the second document being selected to fulfill the each request and impressed on an associated mobile device, and to adjust a budget of the second document based on the projected probability.

20 Claims, 26 Drawing Sheets

(51) Int. Cl.
*G06F 16/951* (2019.01)
*G06F 16/9537* (2019.01)

(56) References Cited

U.S. PATENT DOCUMENTS

2014/0128104 A1    5/2014   Chang et al.
2014/0180825 A1    6/2014   Ramer et al.
2015/0332329 A1*  11/2015   Luo .................... H04W 4/21
                                               705/14.58

OTHER PUBLICATIONS

International Preliminary Report on Patentability, PCT/US2018/022080, dated Sep. 10, 2019, 10 pgs.

* cited by examiner

| Name/Brand | Category | Place Identifier | Place Type | Spatial Index | Doc ID |
|---|---|---|---|---|---|
| Costco | General | US/CA/Almaden | BC | a1, a2, ..., ai | 132475 |
| Costco | General | US/CA/Almaden | BP | b1, b2, ..., bj | 135678 |
| Costco | General | US/CA/Almaden | BR | c1, c2, ..., ck | 136572 |
| T.J Maxx | Department | US/CA/Almaden | BC | d1, d2, ..., dl | 156321 |
| T.J Maxx | Department | US/CA/Almaden | BP | e1, e2, ..., em | 154376 |
| T.J Maxx | Department | US/CA/Almaden | BR | c1, c2, ..., ck | 157643 |
| Trader Joe's | Grocery | US/CA/Almaden | BC | f1, f2, ..., fn | 256321 |
| ....... | ....... | ....... | | | |

FIG. 2C

| Geo-Bock ID | Spatial Index | Meta Data | | | | | |
|---|---|---|---|---|---|---|---|
| | | City/State | Functionality | Major POI | Demographic | inventory | |
| ...... | ...... | ...... | ...... | ...... | ...... | ...... | |
| 1234568 | a1, a2, ..., ai | Santa Clara/CA | Residential | Santa Clara High School | ...... | ...... | |
| 1234569 | b1, b2, ..., bj | Santa Clara/CA | Retail | New India Bazar | ...... | ...... | |
| 1234570 | c1, c2, ..., ck | Santa Clara/CA | Residential | Pomeroy Elementary | ...... | ...... | |
| 1234571 | d1, d2, ..., dl | Santa Clara/CA | Retail | Moonlight Shopping Center | ...... | ...... | |
| ...... | ...... | ...... | ...... | ...... | ...... | ...... | |
| 1234573 | f1, f2, ..., fn | Santa Clara/CA | Recreational | Branham Park | ...... | ...... | |
| ...... | ...... | ...... | ...... | ...... | ...... | ...... | |

FIG. 2E

| Request ID | Device Data | Mobile Entity Data | Time Stamp | Location Data | Keywords |
|---|---|---|---|---|---|

| Request ID | Device Data | Mobile Entity Data | Time Stamp | Lat/Long | Keywords |
|---|---|---|---|---|---|

| Request ID | Device Data | Mobile Entity Data | Time Stamp | Keywords | Location Feature | ⋯ | Location Features |
|---|---|---|---|---|---|---|---|

⎫ 310 ⎫ 312 ⎫ 314

| Place ID | Name | Category | Fence Type | ⋯ |
|---|---|---|---|---|

| Geoblock ID | City/State | Functionality | Major POI | ⋯ |
|---|---|---|---|---|

FIG. 3C

| Packet ID | Device Information | | User Information | | | Location Information | | Time Stamp | |
|---|---|---|---|---|---|---|---|---|---|
| | UID | Make/Model | Age | Gender | Other Info | Site Name | Place Type | Day | Hour |
| 0136819976 | 22***369 | Iphone 4 | 22 | F | C/U | Null | Null | 3/1/2017 | 12:55 |
| 0136819975 | 56***845 | Iphone 5 | 47 | F | HS | B123 | Y | 3/1/2017 | 12:53 |
| 0136819974 | 36***963 | Nokia 2300 | 25 | M | C/U | B118 | Y | 3/1/2017 | 12:53 |
| 0136819973 | 45***895 | Nokia 4566 | 36 | F | HS | Null | Null | 3/1/2017 | 12:52 |
| 0136819972 | 36***412 | Samsung 1179 | 23 | M | G/S | B165 | Z | 3/1/2017 | 12:51 |
| ... | ... | ... | ... | ... | ... | ... | ... | ... | ... |
| | 78***697 | Samsung 1179 | 42 | F | C/U | B148 | Y | 2/24/2017 | 10:31 |
| 0125785237 | 56***845 | Iphone 5 | 47 | F | HS | Null | Null | 2/24/2017 | 10:30 |

FIG. 3D

| Mobile Entity Data | | | Doc ID: ###-###-### | Name/Brand/Category: XXXXXXX | KPI Base/Price: XX/#### | | | | | | | | | | | | | |
|---|---|---|---|---|---|---|---|---|---|---|---|---|---|---|---|---|---|---|
| | | | 512 Impression | | | 522 Click/Call | | | | | 532 S/A | | | | | 542 Visit | | | |
| | | | Impression | | | Click/Call | | | Click/Call | | S/A | | | S/A | | Visit | | Visit | |
| UID | Age | Gen | Day | Hour | ... | Day | Hour | ... | Day | Hour | Day | Hour | ... | Day | Hour | Day | Hour | Day | Hour | ... |
| ######### | ## | X | ##/## | ##:## | | ##/## | ##:## | | ##/## | ##:## | | | | | | | | | |
| ######### | ## | X | ##/## | ##:## | | ##/## | ##:## | | | | ##/## | ##:## | | | | | | | |
| ######### | ## | X | ##/## | ##:## | | | | | | | | | | | | ##/## | ##:## | ##/## | ##:## | |
| ⋮ | ⋮ | ⋮ | ⋮ | ⋮ | | ⋮ | ⋮ | | ⋮ | ⋮ | ⋮ | ⋮ | | ⋮ | ⋮ | ⋮ | ⋮ | ⋮ | ⋮ | |

FIG. 5B

| Request ID | Device Information | | User Information | | | | Location Information | | Time of Request | | Fulfillment | | SV? |
|---|---|---|---|---|---|---|---|---|---|---|---|---|---|
| | UID | Make/Model | Age | Gender | Other Info | | Business Name | Place Type | Day | Hour | DocID | Imp | |
| 0136819976 | 22***369 | Iphone 4 | 22 | F | C/U | | B289 | X | 3/1/2017 | 12:55 | D0123 | Yes | Yes |
| 0136819975 | 56*845 | Iphone 5 | 47 | F | HS | | B123 | Y | 3/1/2017 | 12:53 | D0321 | No | Yes** |
| 0136819974 | 36***963 | Nokia 2300 | 25 | M | C/U | | B118 | Y | 3/1/2017 | 12:53 | D4325 | No | No |
| 0136819973 | 45***895 | Nokia 4566 | 36 | F | HS | | B279 | Z | 3/1/2017 | 12:52 | D0237 | Yes | No |
| 0136819972 | 36***412 | Samsung 1179 | 23 | M | G/S | | B165 | Z | 3/1/2017 | 12:51 | D0892 | No | No |
| ... | ... | ... | ... | ... | ... | | ... | ... | ... | ... | ... | ... | |
| | 78***697 | Samsung 1179 | 42 | F | C/U | | B148 | Y | 2/24/2017 | 10:31 | D7438 | No | Yes |
| 0125785237 | 56*845 | Iphone 5 | 47 | F | HS | | B337 | X | 2/24/2017 | 10:30 | D2765 | Yes | No** |

FIG. 6A

| Geo-Block ID: ######## | City/State: XXXXX/XX | Function: XXXXXX | Major POI: XXXXXX | ...... | | | | | | | | | | |
|---|---|---|---|---|---|---|---|---|---|---|---|---|---|---|
| Mobile Entity Data | | | Requests (1122) | | | | | | | | | Visits/Clicks/Sas (1132) | | |
| | | | Time Stamp | | Geo Block | Time Stamp | | Geo Block | Time Stamp | | Geo Block | Time Stamp | | |
| UID | Age | Gen | Day | Hour | | Day | Hour | | Day | Hour | | Day | Hour | ...... |
| ######### | ## | M | ##/## | ##:## | xxxxx | ##/## | ##:## | xxxxx | ##/## | ##:## | xxxxx | ##/## | ##:## | ...... |
| ######### | ## | M | ##/## | ##:## | xxxxx | ##/## | ##:## | xxxxx | | | | | | |
| ######### | ## | M | ##/## | ##:## | xxxxx | ##/## | ##:## | xxxxx | | | | ##/## | ##:## ##/## ##:## | ...... |
| : | : | : | : | : | : | : | : | : | : | : | Geo | : | : | |

FIG. 11B

USING ON-LINE AND OFF-LINE PROJECTIONS TO CONTROL INFORMATION DELIVERY TO MOBILE DEVICES

CROSS REFERENCE TO RELATED APPLICATION

The present application claims the benefit of priority to U.S. Provisional Patent Application No. 62/470,119, filed Mar. 10, 2017, which is incorporated herein by reference in its entirety.

FIELD

The present application is related to information technologies, and more particularly to system and method of using on-line and off-line projections to control information delivery to mobile devices.

DESCRIPTION OF THE RELATED ART

Smart phones and other forms of mobile devices are becoming more and more widely used. Nowadays, people use their mobile devices to stay connected with other people and to obtain information and services provided by mobile service providers and application developers. To keep the information and services free or low-cost, mobile service providers and application developers fund their activities at least partially by delivering sponsored information to the mobile devices that are engaging with them. The sponsored information is provided by sponsors who are interested in delivering relevant information to mobile users' mobile devices based on their locations. As a result, more and more mobile applications are designed to send location information of the mobile devices interacting with them (i.e., mobile supplies) to providers of location-based services (LBS).

To take advantage of the mobile nature of mobile phones, sophisticated computer technologies have been developed by information providers to estimate mobile device locations based on the signals they send and to select relevant and timely information to the mobile devices based on their estimated locations and other factors. Additionally, mechanisms are set up by hardware and software to track on-line activities using the mobile devices in response to the information they receive. These on-line activities have been used to derive performance measures for the delivered information and to control future information delivery. But, such performance measures are insufficient or inaccurate in many cases, especially when off-line conversions are the main responses to the delivered information.

BRIEF DESCRIPTION OF THE DRAWINGS

FIG. 2C is a table illustrating examples of geo-fences stored in a geo-fence database according to certain embodiments.

FIG. 2E is a table illustrating exemplary data structures of meta data enriched geo-blocks according to certain embodiments.

FIGS. 3A-3C are block diagrams illustrating some of the content of a request at different stages of processing by the request processing system according to certain embodiments.

FIG. 3D is a table illustrating exemplary content in a location log database according to certain embodiments.

FIG. 5B is a table illustrating exemplary content in the data stores of the evaluation module according to certain embodiments.

FIG. 6A is a table illustrating location historical data of a few mobile users according to certain embodiments.

FIG. 11B is a table illustrating exemplary content in the data stores of the evaluation module according to further embodiments.

DESCRIPTION OF THE EMBODIMENTS

Figure 1A:
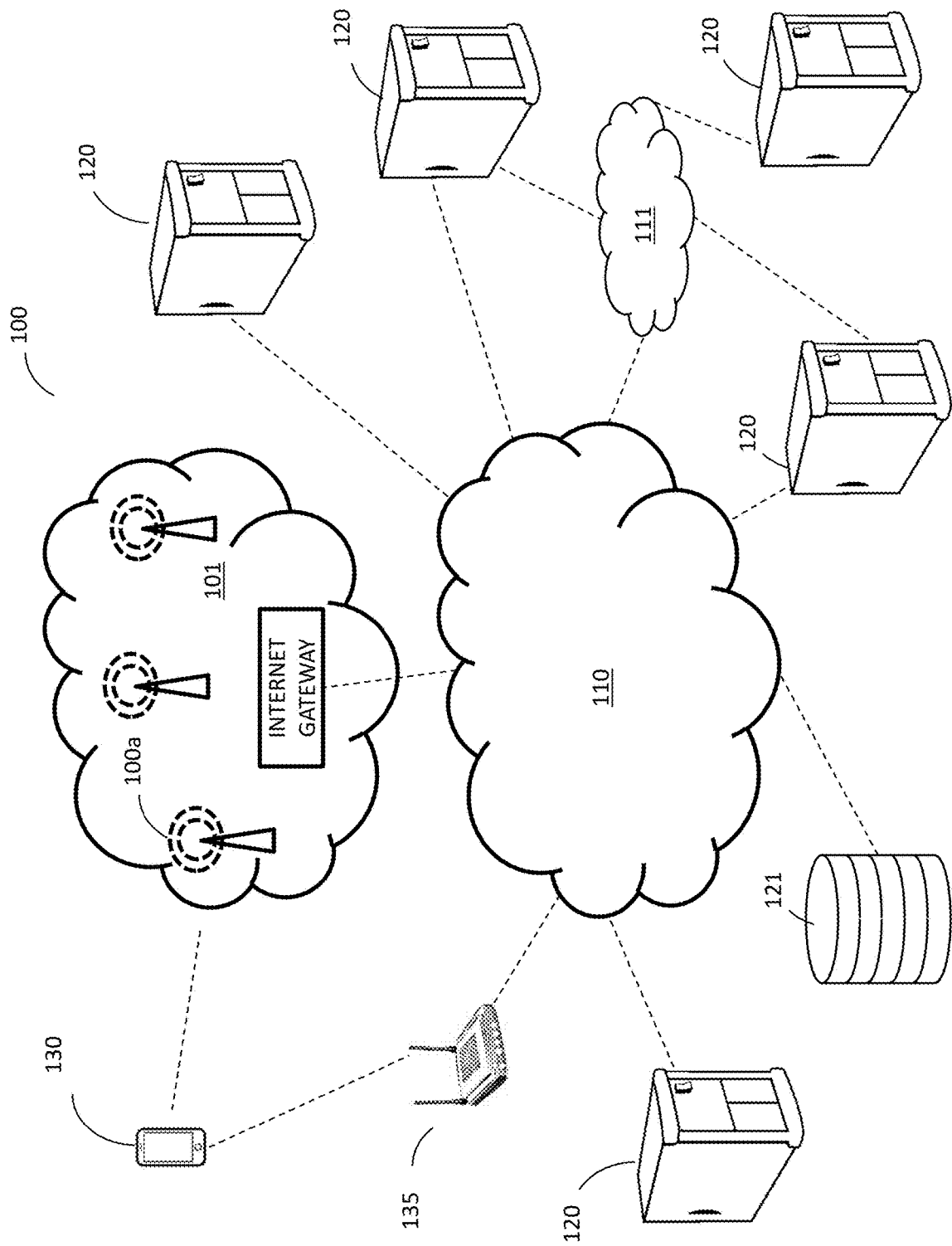
FIG. 1A is a schematic diagram illustrating an overview of an environment 101 in which some embodiments of the disclosed technology may operate.

FIG. 1A is a schematic diagram illustrating an overview of an environment 101 in which some embodiments of the disclosed technology may operate. Environment 101 can include one or more computer systems 120 coupled to a packet-based network 100. The packet-based network 100 in certain embodiments includes the Internet 110 and part or all of a cellular network 111 coupled to the Internet 110 via an Internet Gateway. The computers/servers 120 can be coupled to the Internet 110 using wired Ethernet and optionally Power over Ethernet (PoE), WiFi, and/or cellular connections via the cellular network 111 including a plurality of cellular towers 111a. The network may also include one or more network attached storage (NAS) systems 121, which are computer data storage servers connected to a computer network to provide data access to a heterogeneous group of clients. As shown in FIG. 1D, one or more mobile devices 130 such as smart phones or tablet computers are also coupled to the packet-based network via cellular connections to the cellular network 111. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110. A mobile device 130, or its user, or anyone or anything associated with it, or any combination thereof, is sometimes referred to herein as a mobile entity.

The computer/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1A, some of the computers/servers 120 are coupled to each other via a local area network (LAN) 111, which in turn is coupled to the Internet 110. Also, each computer/server 120 referred herein can include any collection of computing devices that individually or jointly execute instructions to provide one or more of the systems, modules, methodologies, and functional units discussed herein.

Figure 1B:
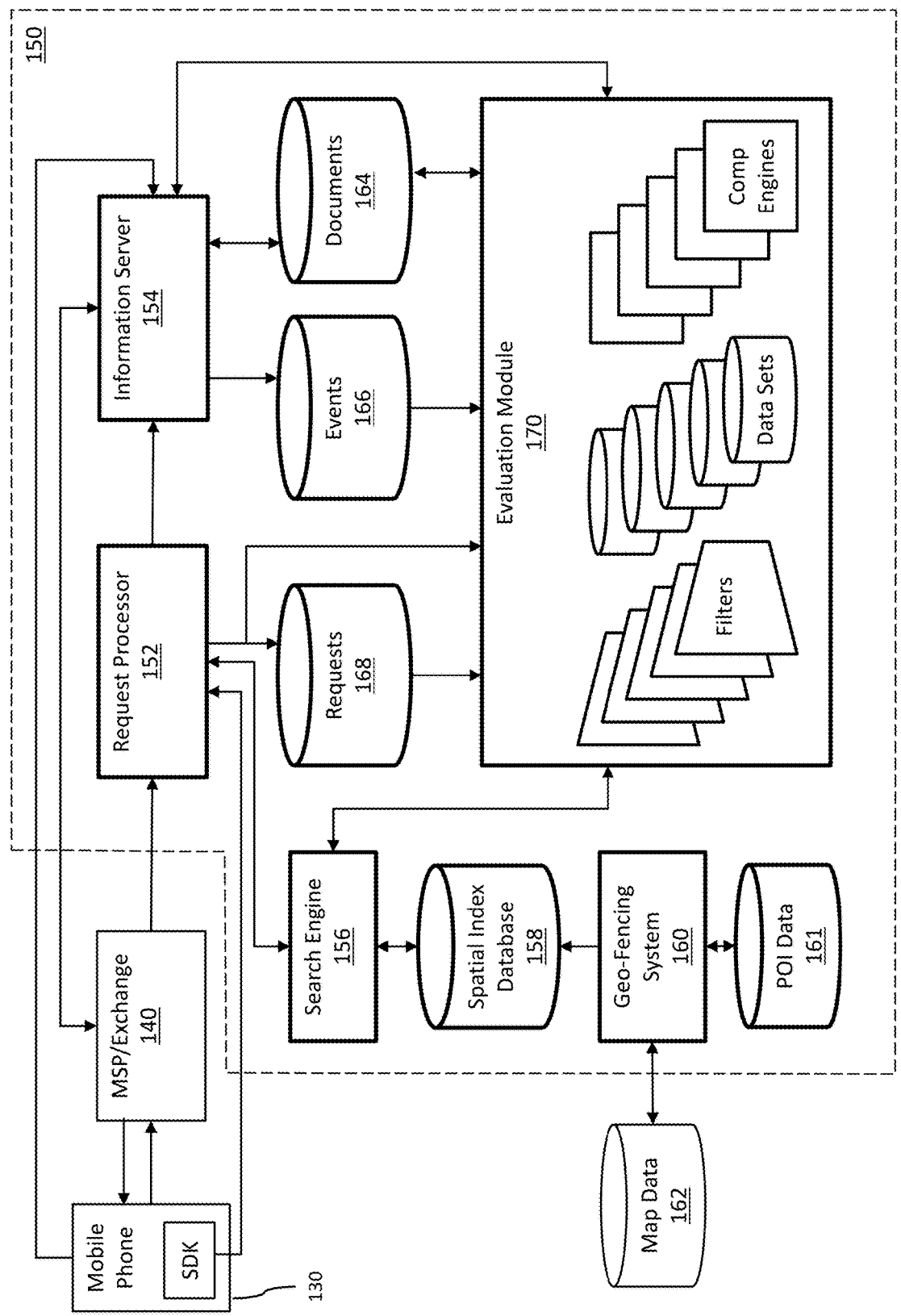
FIG. 1B is a block diagram of an information system according to certain embodiments.

As shown in FIG. 1B, the computers/servers 120 coupled to the Internet may include mobile service provider (MSP) computers/servers 140 that interact with certain mobile devices 130 via software applications (apps) installed on the mobile devices 130. The MSP computers/servers 140 (referred to individually and collectively as the MSP server 140) are coupled via the network 100 to an information delivery system 150 according to certain embodiments. The system 150 can be provided by one or more of the computers/servers 120. As the MSP server 140 interacts with the mobile devices 130, it generates mobile supplies in the form of requests for sponsored information. Each request is transmitted as one or more data packets and include request data such as: a request ID, an identifier that identifies the MSP (i.e., MSP ID), identification (UID) of the mobile device (and/or its user), maker/model of the mobile device (e.g., iPhone 6S), an operating system running on the mobile device (e.g., iOS 10.0.1), certain attributes about the user or mobile entity (e.g., age, gender, income level, education level, etc.), a time stamp, and location data (e.g., a latitude/longitude pair (lat/long, or LL), zip code (ZC), city-state (CS), IP address (IP), etc. Almost all of the request data, except the MSP ID, are derived by the MSP server 140 from the signals it receives from the associated mobile device. For example, the LL may be detected by the GPS function of the associated mobile device and packaged in the data packet it sends to the MSP server 140 if the mobile device is set up to allow its location be known by the MSP server 140. The IP address may be the IP address of a WiFi router or an IP address assigned to the mobile device by a cellular network tower, via which the mobile device is interacting with the Internet. The MSP server 140 may post the mobile supplies on an exchanges for bidding by information providers or their agents, transmit the mobile supplies directly to information servers associated with information providers, or fulfill the supplies themselves.

According to certain embodiments, as shown in FIG. 1B, the system 150 includes a request processor 152 that receives and processes the requests from the MSP server or Exchange 140. In certain embodiments, the request processor 152 examines the location data in each request to determine whether they include a reliable LL pair, and if the request does not include a reliable LL pair, the request processor 152 would proceed to derive the location of the associated mobile device from other information in the location data, as described in more detail in commonly owned U.S. Pat. No. 9,886,703, issued on Feb. 6, 2018, which is incorporated herein by reference in its entirety. The detected mobile device location is input to a search engine 156, which searches in a spatial index database 158 for one or more POI places that includes the detected location and returns the search results to the request processor 152.

In certain embodiments, the system 150 further includes a geo-fencing system 160 that generates the spatial index defining geo-fences associated with the html/JavaScript files delivered by the information server 154. In certain embodiments, the geo-fencing system 160 defines virtual perimeters of defined areas that mirror real-world geographical areas for mobile advertising. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

In certain embodiments, the defined areas include places computed by the geo-fencing system 160 using meta-information and/or geographical information associated with the POIs. As shown in FIG. 3, the geo-fencing system 160 has access to a (POI) data 151 (e.g., InfoUSA), which provides a list of POIs and their corresponding brand names, addresses, and geographical locations. The geo-fencing system 160 also has access to publicly available map data 152 (e.g., Open Street Map at www.openstreetmap.org/), which provides information about the surroundings of the POIs in the POI directory. The geo-fencing system 160 generates definitions of one or more places in the form of, for examples, a set of geographic points defining the perimeters of one or more places for each POI.

Figure 2A:
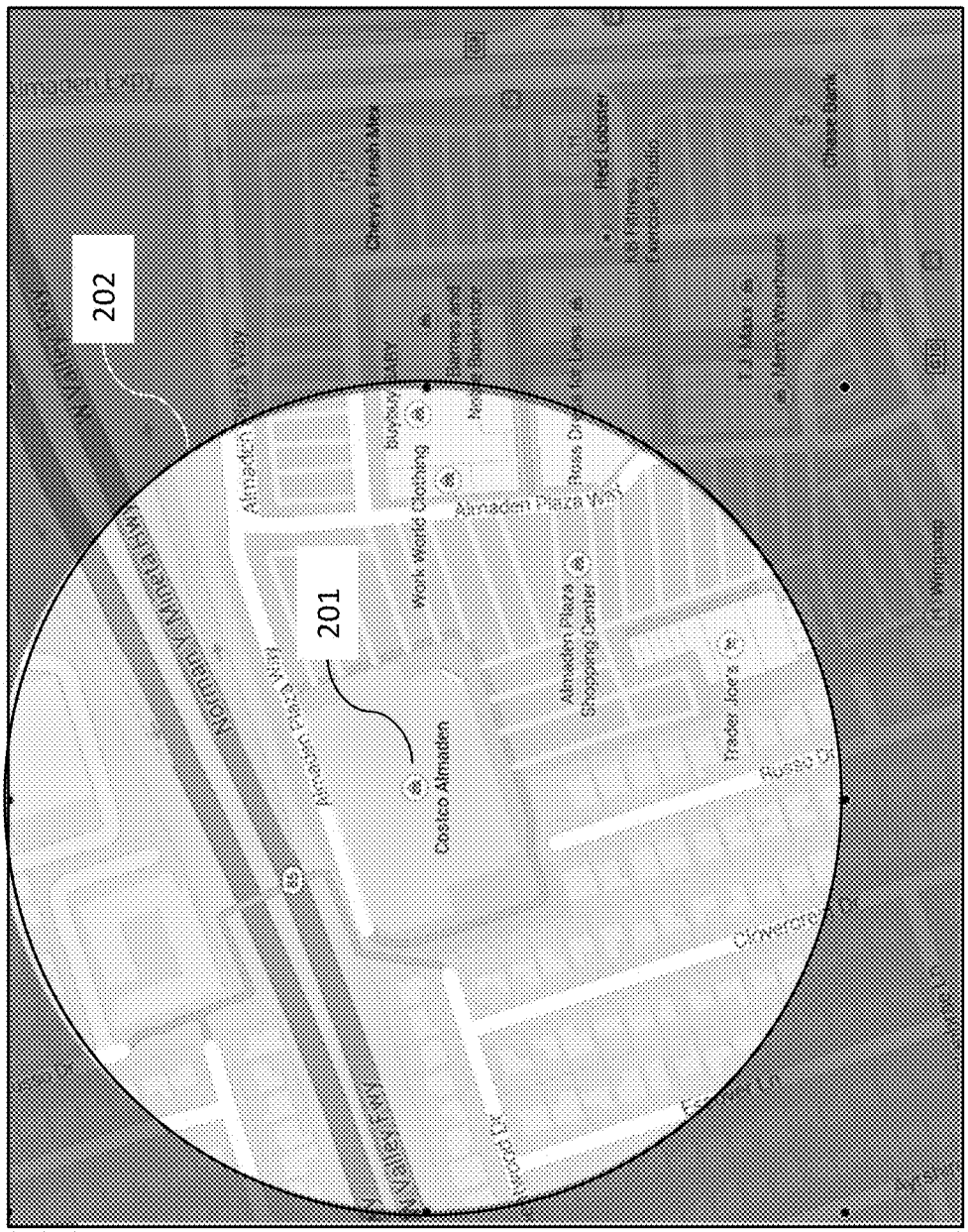
FIG. 2A is a diagrammatic representation a simple geo-fence in the shape of a circle.

In certain embodiments, the geo-fencing system 160 generates or defines one or more places for each of a plurality of POIs in consideration of the map data around the POI. For example, as shown in FIG. 2A, a simple geo-fence for the Costco Almaden store without consideration of the map data can be in the shape of a circle 202 around the store location 201, based on the assumption that a user's intent to visit a given POI could be derived from his or her distance from the POI. However, as shown in FIG. 2A, the circle fence encompasses a major highway, a residential area, and areas on the other side of the major highway. Information about the POI served to mobile devices in these areas would most likely be ignored because people living close to the POI, people traveling on the highway, and people on the other side of the highway are either already familiar with what the POI has to offer or are unlikely to bother to respond to information related to the POI.

Figure 2B:
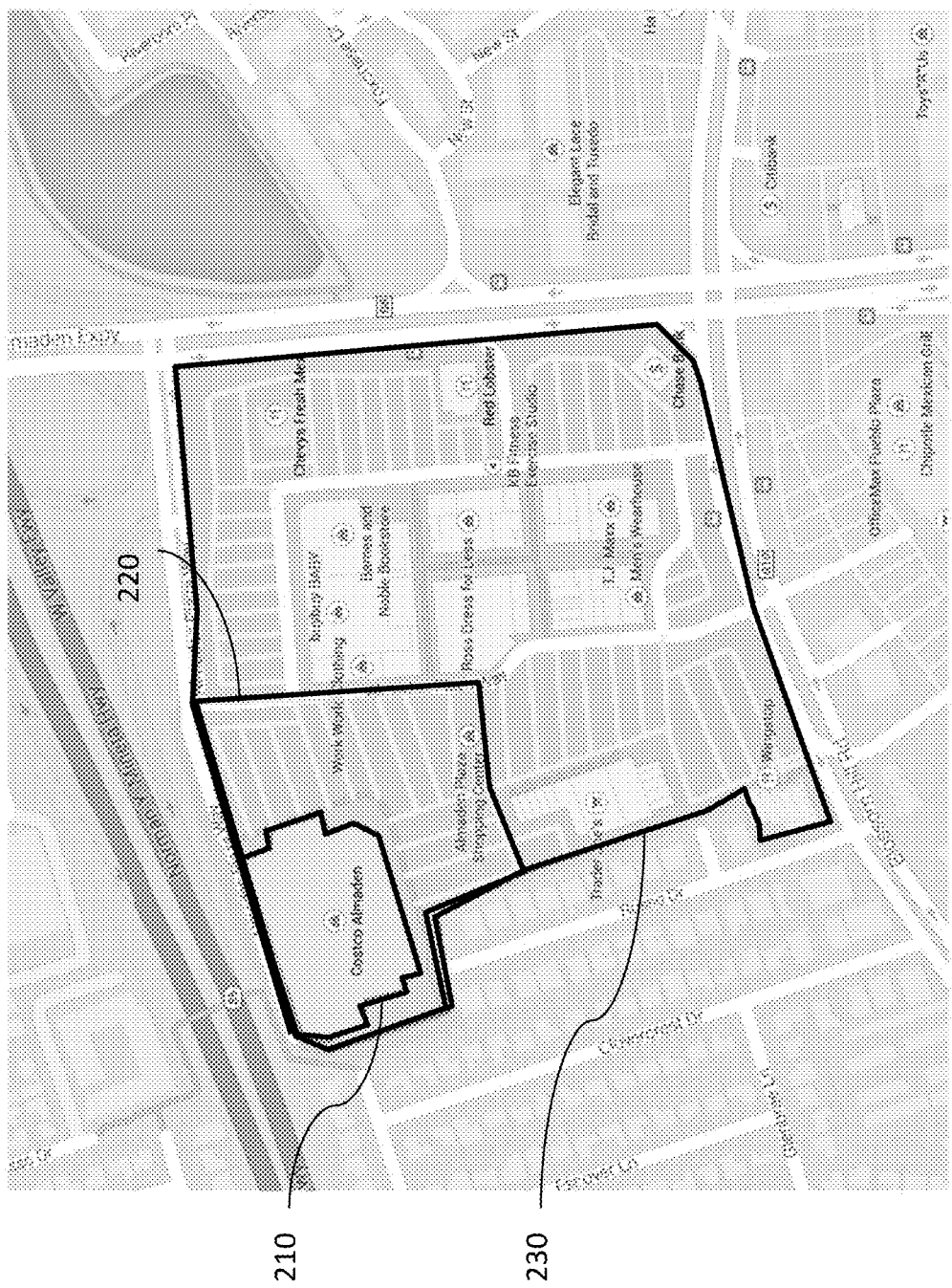
FIG. 2B is a diagrammatic representation of one or more polygon geo-fences defined in conformity with geographical configuration and surroundings of a store according to certain embodiments.

Therefore, instead of or in addition to geo-fences based on a radius around a centroid of a business location, the geo-fencing system 160 according to certain embodiments uses the map data 151 to define places that are of more interests to information sponsors. As shown in FIG. 2B, the geo-fencing system 160 defines one or more polygons in conformity with the geographical configuration and surroundings of the POI, such as a first polygon 210 around the building of the store, a second polygon 220 around the building and its parking lot, and/or a third polygon 430 around a shopping area or business region including the POI and other POIs. More details of such a geo-fencing system can be found in co-pending U.S. patent application Ser. No. 14/716,811, filed on May 19, 2015, which is incorporated herein by reference in its entirety.

In certain embodiments, different types of places may be defined for a POI so that information servers can provide information for delivering to mobile devices based on the type of places triggered by detected locations. For example, a request associated with a mobile device located inside the first polygon 210 around the building of the POI may be more valuable to an information sponsor and thus may be of higher value than a request associated with a mobile device that is in the shopping area (polygon 230) but not inside the store. Or, conversely, polygon 230 may be of higher value to another information sponsor who would like to attract mobile users in the business region than polygon 210, which indicates that the mobile user is already in the store. In certain embodiments, these three types of places are defined by extracting building polygons, parking lot polygons and land-use polygons from local and national geographical information systems (GIS). In certain embodiments, some or all of the places can be defined manually with assistance of computer annotation tools and by consulting some external map and/or satellite data to make sure that the geo-fences are aligned with the real building and region boundary information surrounding the intended businesses.

In certain embodiments, the different types of places associated with a business that are offered to the information sponsors include, for example, (1) a business center (BC) represented by, for example, a polygon corresponding to the perimeter of the building of the business (e.g., the first polygon 210 in FIG. 2B); (2) a business premise (BP) represented by a polygon corresponding to the perimeter of the business building and the neighboring parking lots (e.g., the second polygon 220 in FIG. 2B); and (3) a business region (BR) or area represented by a polygon corresponding to the perimeter of a shopping center or business or commercial area in which this business is located (e.g., the third polygon 230 in FIG. 2B). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

The geo-fencing system 160 further generates spatial indices representing the areas defined by the geo-fencing system 160, which are stored in the spatial index database 158 for searching by the search engine 156 with spatial queries, such as how far two points differ, or whether certain point falls within a spatial area of interest. FIG. 2C illustrates examples of spatial indices of geo-fences stored in the database 158, according to certain embodiments. As shown, the site Costco in Almaden has three different types of places associated with it—place US/CA/Almaden/BC is a business center (BC), which is a polygon around the store building and represented by spatial index a1, a2, . . . , ai; place US/CA/Almaden/BP is a polygon around the site's larger premise including its parking lot and represented by spatial index b1, b2, . . . , bj; and place US/CA/Almaden/BR is a polygon around the shopping center including the store and other POIs and represented by spatial index c1, c2, . . . , ck. FIG. 2C also shows that the site T.J. Maxx has three types of places associated with it, and the site Trader Joe's has at least a business center place associated with it. As shown in FIG. 2C, each geo-fence entry in the database 158 includes the spatial indices associated with the respective place together with other information about the respective place, such as, for example, a name/brand associated with the place, a category of the place, a place identifier identifying a particular locale (e.g., city, district, etc.) for the place, the place type, and/or one or more doc IDs identifying one or more information documents (e.g., one or more html/JavaScript files) for the name/brand or the place.

Figure 2D:
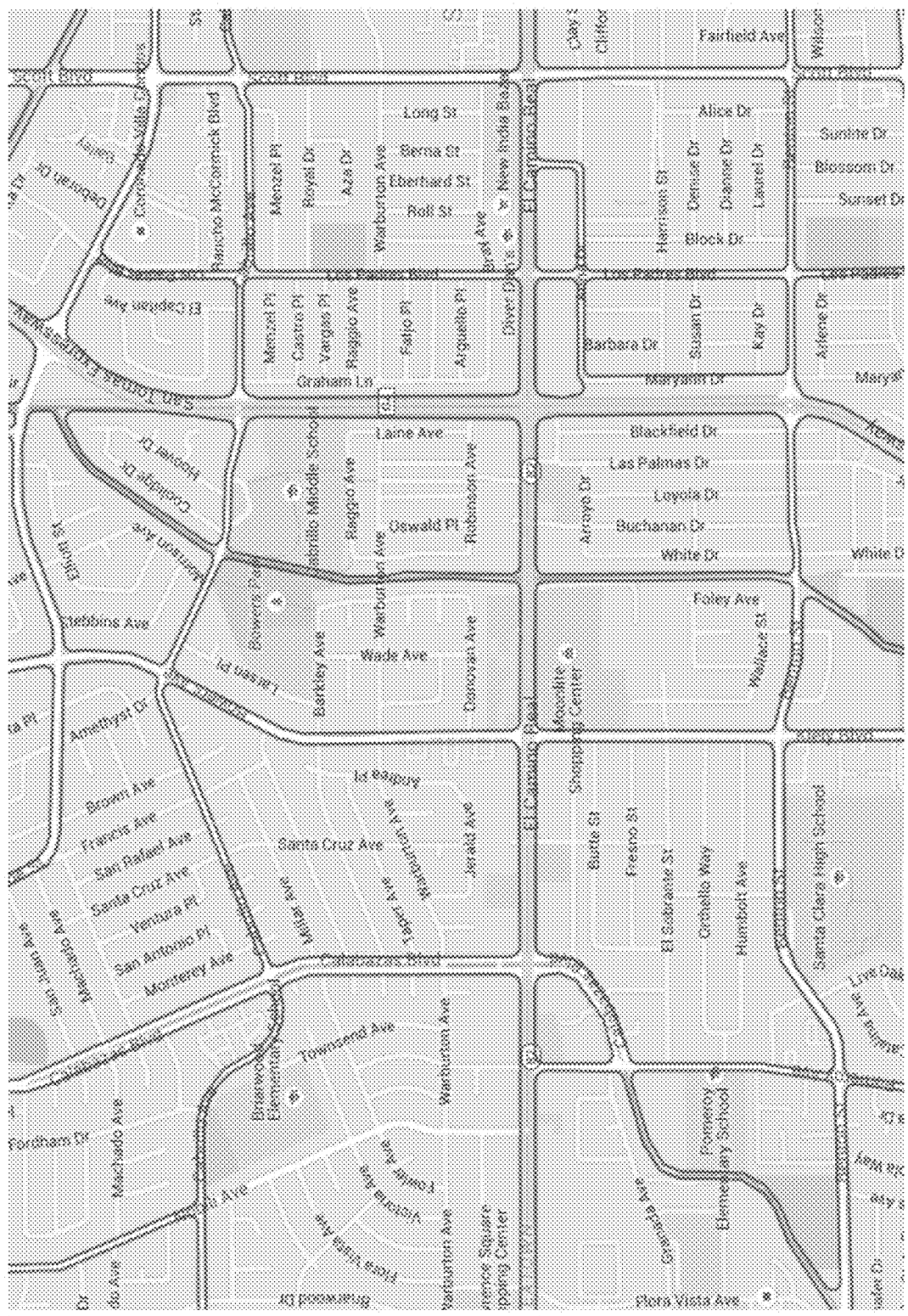
FIG. 2D is map image illustrating exemplary geo-blocks overlaid on a map of a geographical region created by the geo-block definition subsystem according to certain embodiments.

In certain embodiments, in addition to the places associated with POIs, the geo-fencing system 160 further generates geo-blocks representing geographical regions with natural boundaries such as major roads, shorelines, mountain ranges, etc., as described in co-pending U.S. patent application Ser. No. 15/344,482, filed Nov. 4, 2016, entitled "Systems and Methods for Performance-Driven Dynamic Geo-Fence Based Targeting," which is incorporated herein by reference in its entirety. FIG. 2D illustrates exemplary geo-blocks created by the subsystem 310 according to certain embodiments. In this example, for an area in the city of Santa Clara, California, the geo-blocks are shown as outlined in red boundaries overlaid on top of a map for the area, taken from, for example, Google Map, and the boundaries of the geo-blocks are mostly aligned with major roads, taking into account the road width so as to exclude mobile signals from travelers on the major roads. Each of the geo-blocks shown can be further partitioned into more granular blocks bordered by smaller roads. Real world entities present in these geo-blocks tend to serve common functional purposes (residential, retail etc.) and these blocks form the foundation for the construction of boundaries that are highly indicative of location dependent attributes such as intention and demographics.

To define the geo-blocks, the geo-fencing system 160 extracts geographical data of transportation route and natural boundary data from the map data 162, and creates geo-blocks using the extracted geographical data. It also derives meta data associated with each of the geo-blocks such as city/state, functionality, major POIs in the geo-block, demographic of residents in the geo-block, etc., from the map data, and other information such as amount of requests received from mobile devices in the geo-block within a certain time period (inventory), demographic of users of the mobile devices (for non-residential geo-blocks), etc., from the logged requests data and events data in the databases 168 and 166, and enriches the geo-blocks with relevant meta data.

Geometrically, transportation routes (highways, railways, waterways etc.), as well as natural boundaries (coastlines, lake boundaries etc.) are described as collections of line segments, together with meta data information such as their type, width and traffic speed. In certain embodiments, these line segments are collected and scored based on their significance, e.g., residential area roads in residential area score lower than highways do. Line segments scored above a threshold are collected to form a line set. The line set thus defined is then used to form polygons with boundaries aligned with the lines in the line set. The polygons thus formed, together with their associated meta data such as are initial geo-blocks, which are indexed and stored in the spatial index database 158, as shown in FIG. 2E.

In general, the definition of geographical regions is not limited to that described above. A different set of geographical regions with or without its own meta information can also be used for the subsequent processes.

In certain embodiment, the search engine 156 and some or all of the spatial index database 158, the geo-fencing system, and the POI database 151 can be part of the request processor 152.

In certain embodiments, as shown in FIGS. 3A-3C, the request processor 152 receives request 301 from the MSP server 140 via network 100. The request 301 includes mobile device location information including a plurality of location components, such as latitude and longitude coordinates (LL), IP addresses (IP), postal or zip codes (ZC), and/or city-state names (CS), etc, in addition to other information. In certain embodiments, the request processor 152 validates the location information by checking the validity and consistency of the location components and by weeding out any invalid location component(s). Generally, the LL is usually believed to be the most useful location component. However, when a mobile entity doesn't allow its location information to be known, mobile applications at the MSP server 140 typically provide only coarse location data in the form of, for example, an IP address, a ZC (e.g. entered by the user at the time of registration), or CS. Thus, mobile applications at the MSP server 140 frequently provide LLs obtained from geo-coding software, which translates ZC, CS, and other points of interests into one representative LL. In one embodiment, such representative LLs are categorized as "bad LLs". A bad LL can be, for example:

1. A centroid of a ZC/CS
2. Any fixed point on a map (e.g. (0,0) or an arbitrary location)

In certain embodiments, the request processor 152 is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

The request processor 152 estimates the location of the mobile device from the request 301 and generates location data to represent an estimated mobile device location, which may be a geographical point represented by a lat/long pair or one or more probably areas or regions the mobile device is estimated to be in, as shown in FIG. 3B. The search engine 156 queries the spatial index database 158 with the lat/long pair to determine whether the location triggers one or more predefined places in the database 158, and returns the triggered place(s) to the request processor 152, which annotates the request 301 with the triggered place(s) to generate an annotated request 310, and stores the annotated request 510 in the request log 168. Additionally, the search engine 156 also queries the spatial index database 158 with the lat/long pair to determine whether the location is in one of the geo-blocks in the database 158, and returns the triggered geo-block to the request processor 152, which annotates the request 301 with the triggered geo-block. Thus, the annotated request 310 can also include the triggered geo-block, as shown in FIG. 3C.

In certain embodiments, as shown in FIG. 3A, the request 301 received from the Internet by the request processor includes other information as well as the location information, such as information about the mobile device and/or a mobile user associated with the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 2B, a request that triggers the BC place 410 of Costco Almaden also triggers the BR place 430 of any of the POIs in the same business region. Thus, the request may be annotated with the BC place of Costco Almaden and the BR place of one or more other POIs in the same business region. As shown in FIG. 3C, each of the one or more places or geo-fences includes either or both of a place ID, a name and/or a category of the POI or its associated brand if any, and a place type (e.g., BC, BP, BR, or circle), some or all of which can be included in the annotated request 310.

In certain embodiments, a panel of mobile devices 130 are signed up to provide periodic location updates to the request processor 152 by installing and running a software development kit (SDK). Each location update is transmitted from a mobile device 130 to the packet-based network 101 in the form of one or more data packets that include the mobile device information, a time stamp and a lat/long pair indicating the mobile device location. The request processor 152 processes each location update similarly as it processes an information request and logs the location updates in a designated field in the requests database 168. FIG. 3D is a table illustrating examples of processed location updates.

Figure 4A:
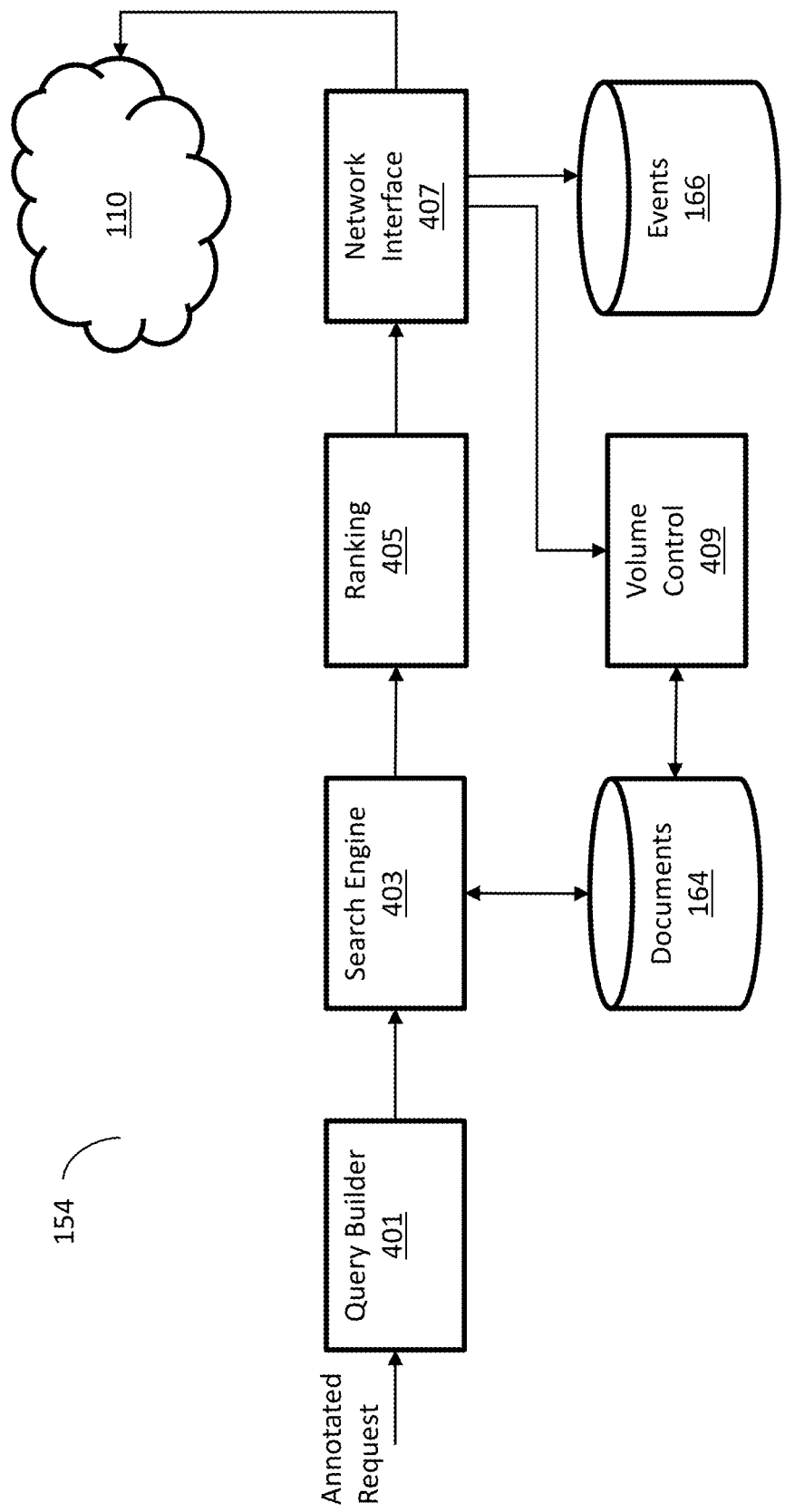
FIG. 4A is a block diagram of an information server according to certain embodiments.
Figure 4B:
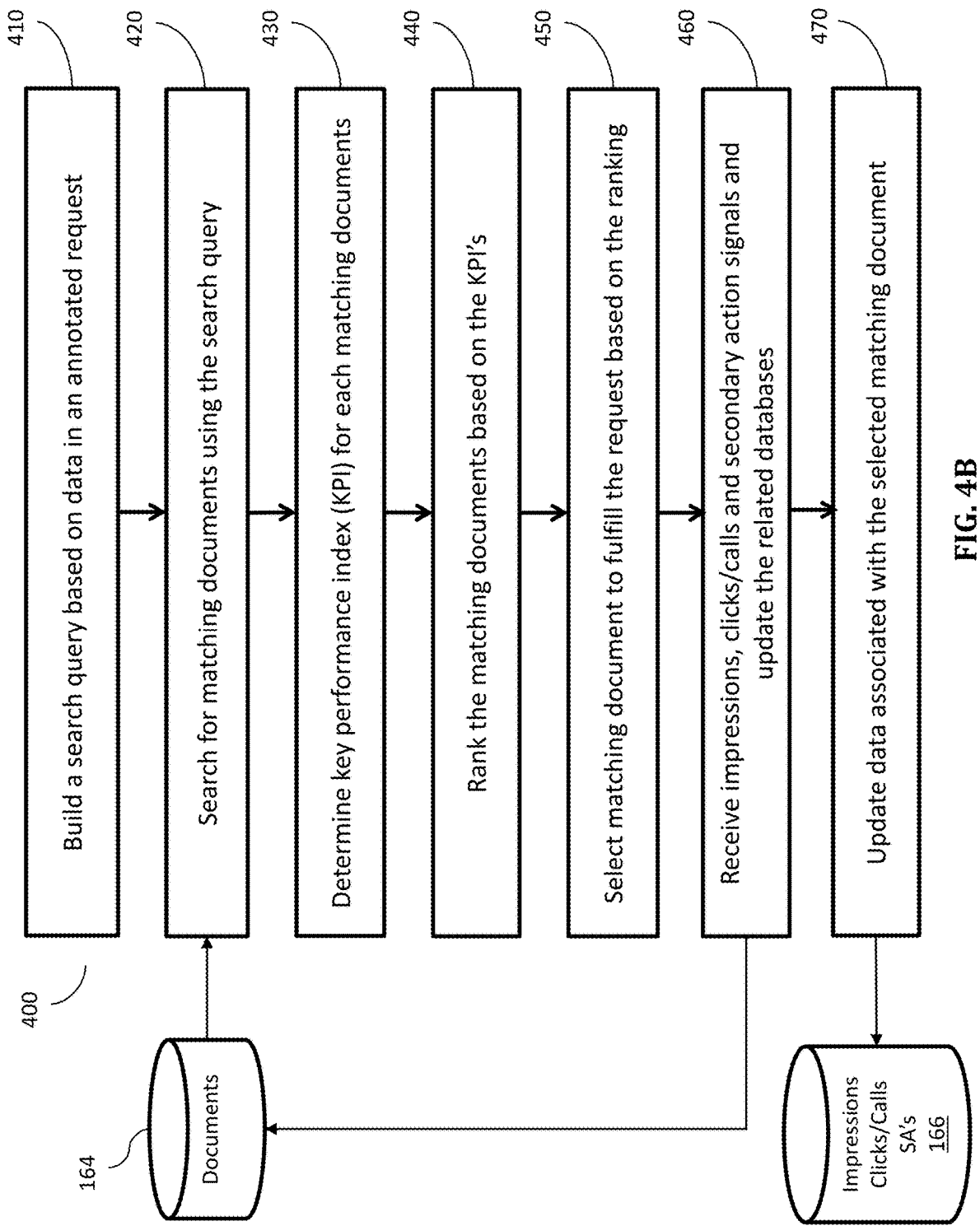
FIG. 4B is a flowchart illustrating a method performed by the information server according to certain embodiments.

In certain embodiments, the system 150 further includes an information server 154 that selects and transmits sponsored information to the MSP server (or Exchange) in response to each annotated request 310 output from the request processor 152. In certain embodiments, the information server 154 is a computer server, e.g., a web server, backed by a database server 164 that information sponsors use to periodically the content thereof—e.g., information documents, which when loaded on a mobile device displays information in the form of, for examples, banners (static images/animations) or text. FIG. 4B illustrates a process 400 carried out by the information server 154 according to certain embodiments. As shown in FIGS. 4A and 4B, the information server 154 includes a query builder 401 configured to build (410) a search query based on the data in the annotated request 310, a search engine 403 configured to search (420) the documents database 164 for one or more matching documents, and a ranking module 405 configured to determine (430) a key performance index (KPI) for each of the one or more matching documents, and to rank (440) the one or more matching documents based on the KPI's.

In certain embodiments, the one or more matching documents may include at least one first matching document having an associated KPI based on related on-line activities of mobile devices (e.g., clicks, calls, secondary actions, etc.) and at least one second matching document having an associated KPI based on related off-line activities of mobile devices (e.g., detected site visits, etc.). The KPI may also be dependent on the location data in the request, as mobile devices at certain locations may indicate higher likelihood of clicks/calls or secondary actions or site visits, and therefore higher projected performance, than mobile devices at other locations.

In certain embodiments, as shown in FIG. 4B, the ranking unit 405 is further configured to select (450) a matching document to fulfill the request based on the rankings, and the information server 154 further includes a network interface 407 configured to transmit information about the selected matching document to the requester via the packet-based network 110. The information can be provided in the form of, for example, an html/JavaScript file, or a link to a universal resource location (URL), which can be used by the MSP or a mobile device to fetch the html/JavaScript file. The html/JavaScript file, once displayed or impressed on a mobile device, also include one or more links that an interested user can click to access a webpage or place a call using the mobile device. The webpage enables the user of the mobile device to take secondary actions such as downloading an app or make an on-line purchase.

In certain embodiments, the html/JavaScript file is designed such that when it is displayed or impressed on a mobile device, a signal is sent by the MSP server or the mobile device automatically so that the information server 154 can keep track of whether the file has really been impressed on the mobile device. In certain embodiments, mechanism are also put in place such that when any of the one or more links are clicked, or when the mobile user download an app or make a purchase from a linked webpage, a signal is also sent from the mobile device to the information server 154 in the background so that the information server 154 can keep track of the clicks/calls or secondary actions made in response to the impression. The network interface 407 receives and records (460) such events (i.e., impressions, clicks/calls, and secondary actions) in the events database or log 166.

In certain embodiments, some or all of the documents in the documents database 164 may have limited budgets on the numbers of impressions/clicks/calls associated therewith. Thus, the ranking unit, before selecting a matching document to fulfill the request, may check to make sure that there is sufficient budget remaining for the matching document. Otherwise, the ranking unit may select the next ranked matching document. In certain embodiments, the information server 154 further includes a volume control unit 409 configured to adjust or update (470) the budget of a document in the documents database 154 in response to an impression/click/call event related to the document, or using a projection value of a possible site visit, as discussed further below.

Thus, logged data in the requests log 168 and the events log 166 collected over a period of time (e.g., six months) form a large collection of mobile device data (e.g., millions and millions of annotated requests and impression/click/call events). In certain embodiments, the system 150 further includes an evaluation module 170 having a set of specifically designed filters to query the big data in the requests log 168 and the events log 166 to obtain various data sets related to specific aspects of the performance of the delivered information documents. The evaluation module 180 further includes one or more electronic storages that stores the data sets for use by a set of computation engines designed to derive different types of performance measures or projections, which are used by the information server 154 to determine the KPI's of the matching documents.

Various methods have developed to fund mobile information campaigns geared at accommodating campaign budgets and campaign goals. Examples of such models include cost-per-mille (CPM), cost-per-install (CPI), and cost-per-click (CPC) models. These are just a few of the basic models for valuing mobile information delivery, which information providers can select to fund their information campaign on mobile devices.

CPM is the valuation model that is sometimes referred to as "pay-per-impressions." CPM in contemporary English simply means "cost per thousand." In a CPM campaign, an information provider pays the agreed bid rate for every 1,000 times a related document is displayed (i.e., impressed) on mobile devices. This model protects the mobile service providers, but does not provide any guarantee on results. Since CPM information providers pay for impressions and not for clicks and installs, they tend to use the delivered information mainly to raise awareness.

Moving one step closer to performance, information providers can also use the so called cost per click (CPC) model, (also known as PPC, i.e., pay per click), whether or not the clicks they pay result in actual conversions. With the CPC model, documents are chosen to be served to mobile device users based on a combination of the click-through rates (CTR) associated with the documents and the per-click bids that information providers make.

Cost per install (CPI), also known as cost-per-acquisition (CPA), charges information providers every time a delivered document results in a conversion, which can be, for example, people actually making a purchase, downloading an app, or performing another action recommended by the document. Thus, CPI campaigns help to give medium and small companies with limited marketing budgets a predictable return on their advertising investment. In addition, due to the growing fraud and viewability issues in online advertising, information providers commonly prefer pricing models such as CPI/CPA to get better value and protection for their money. The issues with this trend, however, is the increasing complexity of ad delivering systems in order to address issues such as conversion prediction, budget control, etc.

Furthermore, although the CPA model is appropriate for information campaigns with online conversion goals (such as in ecommerce), it is ineffective for tracking offline conversions. Therefore, some information sponsors may choose to pay for each physical site visit derived from an information campaign, so they do not need to be concerned about issues such as viewability, click fraud, etc. Also, in many industries, a site visit carries a known average purchase value. Thus, the value of each site visit can be clearly understood. Therefore, site visit based performance measure or projection allows the information providers to better understand their return of investment (ROI).

While a cost per visit (or CPV) model is desirable to many information providers, it requires novel techniques including: (a) a SVR (location visitation rate) estimation system, (b) a performance evaluation and budget control system bridging the CPM and CPV worlds, allowing a CPV model for some information sponsors even when the majority of the mobile service providers still charge on CPM; and (c) a adaptive attribution system capable of giving different location visitations different levels of credits.

Figure 5A:
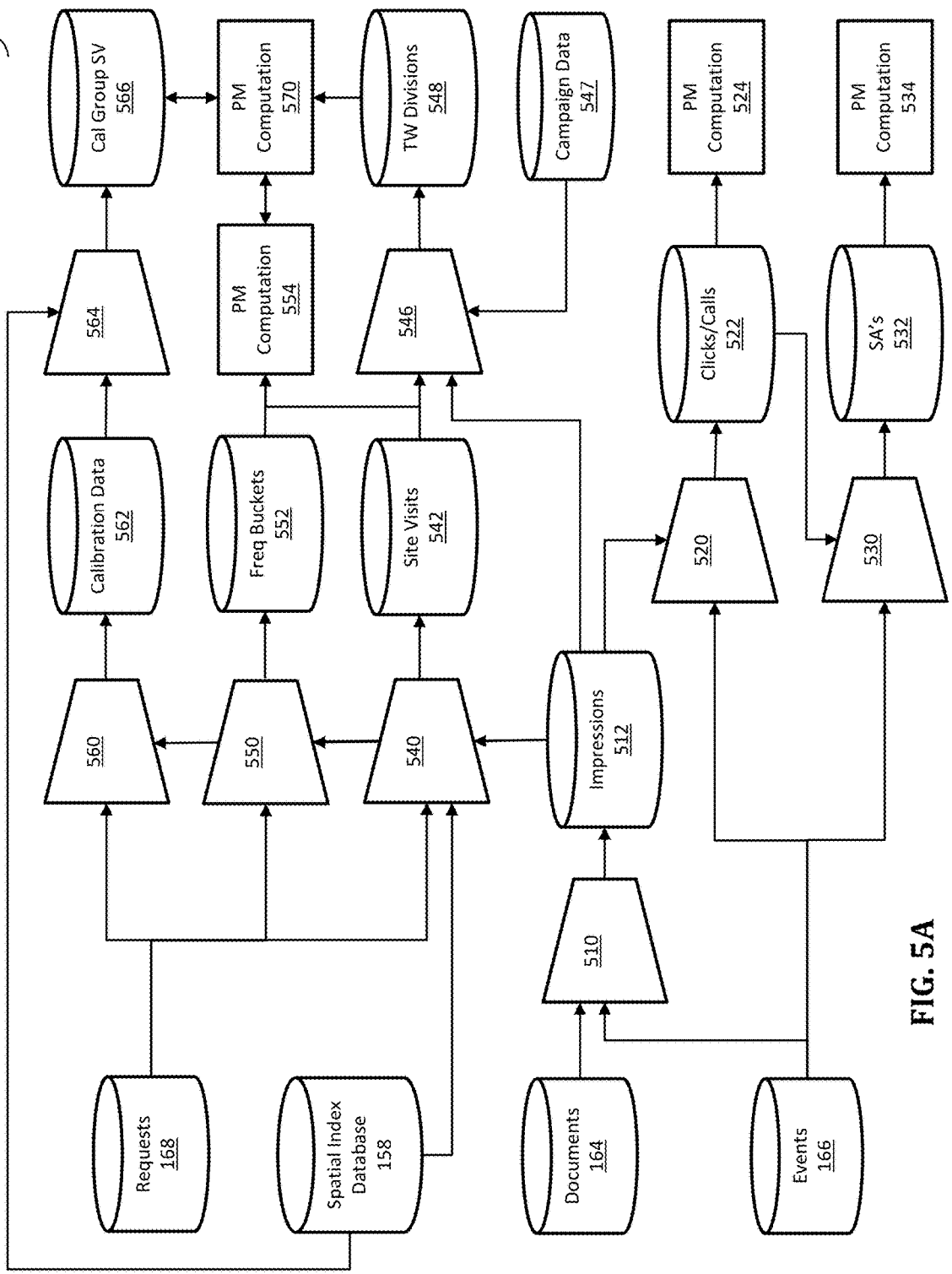
FIG. 5A is a block diagram of an evaluation module in the information system according to certain embodiments.

FIG. 5A is a block diagram of some of the components in the evaluation module 170 according to certain embodiments. As shown in FIG. 5A, the evaluation module 170 includes a filter 510 configured to obtain data related to each of a plurality of documents in the documents database 164, such as a document ID, a name/brand and/or category associated with the document, a type of performance measure (e.g., impression-based, click/call based, secondary action based, or site visit based, etc.) associated with the document, a price or cost for each impression, or click/call, or site visit, etc., to query the events database 166 for impression events related to the document, and to store data associated with the impression events in a data store 512. FIG. 5B illustrates examples of the impression events in the data store 512 grouped by each document and listed by the UID's of the mobile devices impressed with the document. As shown, each of the impressed mobile devices can have one or more impressions of the document with different time stamps (Day/Hour). The evaluation module 170 may further includes a computation engine (CB) 524 configured to count the number of mobile devices listed in the data store 522 and the number of mobile devices each having had at least one click/call event, and to compute a performance measure ($PM|_{CC}$) that is based on click/call events (CC) as follows:

$$PM|_{CC}=CPC*CTRest*1000,$$

where CPC is the cost per click/call, CTRest is an estimated click through rate, which can be the ratio of the number of mobile devices each having been impressed with the document and having had at least one click/call event over the number of mobile devices listed in the data store 522. The multiplier of 1000 is to map the performance measure to the CPM valuation model.

As shown in FIG. 5A, the evaluation module 170 may further includes a filter 520 configured to obtain data related to each of the impressed mobile devices in the data store 510, to query the events database 166 for click/call events related to the document, and to store data associated with the click/call events in a data store 522. FIG. 5B illustrates examples of the click/call events in the data store 522 grouped by each document and listed by the UID's of the mobile devices impressed with the document. As shown each of the impressed mobile devices can have none or one or more click/call events related to the document with different time stamps (Day/Hour).

As shown in FIG. 5A, the evaluation module 170 may further includes a filter 530 configured to obtain data related to each of the impressed mobile devices having had at least one click/call event according to the data in the data store 522, to query the events database 166 for secondary action events related to the document, and to store data associated with the secondary action events in a data store 532. FIG. 5B illustrates examples of the secondary action events in the data store 532 grouped by each document and listed by the UID's of the mobile devices impressed with the document. As shown each of the mobile devices having had at least one click/call event can have none or one or more secondary action events related to the document with different time stamps (Day/Hour). The evaluation module 170 may further includes a computation engine (CB) 534 configured to count the number of mobile devices listed in the data store 532 and the number of mobile devices each having had at least one secondary action event, and compute a performance measure ($PM|_{SA}$) that is based on secondary action events (SA) as follows:

$$PM|_{SA}=CPI*SARest*1000,$$

where CPI is the cost per install (e.g., download, purchase, etc.), SARest is an estimated secondary action rate, which can be the ratio of the number of mobile devices each having been impressed with the document and having had at least one secondary action event over the number of mobile devices listed in the data store 532. Again, the multiplier of 1000 is used to map the performance measure to the CPM valuation model used for some of the other documents.

In certain embodiments, location visits are tracked based on request data packets associated with the group of users. The location module generates annotated requests from the request data packets, as described above. As shown in FIG. 5A, the evaluation module 170 further includes a filter 540 configured to obtain data related to each of the impressed mobile devices in the data store 512, to query the events database 166 for site visit events related to the document, and to store data associated with the site visit events in a data store 542. FIG. 5B illustrates examples of the site visit events in the data store 542 grouped by each document and listed by the UID's of the mobile devices impressed with the document. As shown each of the mobile devices having had at least one impression event can have none or one or more site visit events related to the document with different time stamps (Day/Hour). The site visits are detected from the annotated requests, which are annotated with places having the same number/brand and/or category as the document.

Unlike the processes of obtaining the CC-based and SA-based PM values, where the clicks/calls and secondary actions can be tracked electronically as originating from the delivered information, this is not so with site visits because a detected site visit may or may not be the result of an impression event, especially when the visit happens before or long after the impression event. Therefore, the evaluation module 170 further includes a filter 546 configured to obtain information campaign data related to the document from a campaign database 547, to filter the data in the data store 542 to obtain site visit data in different time windows, and to store the filtered site visits data in a data store 548.

Figure 6B:
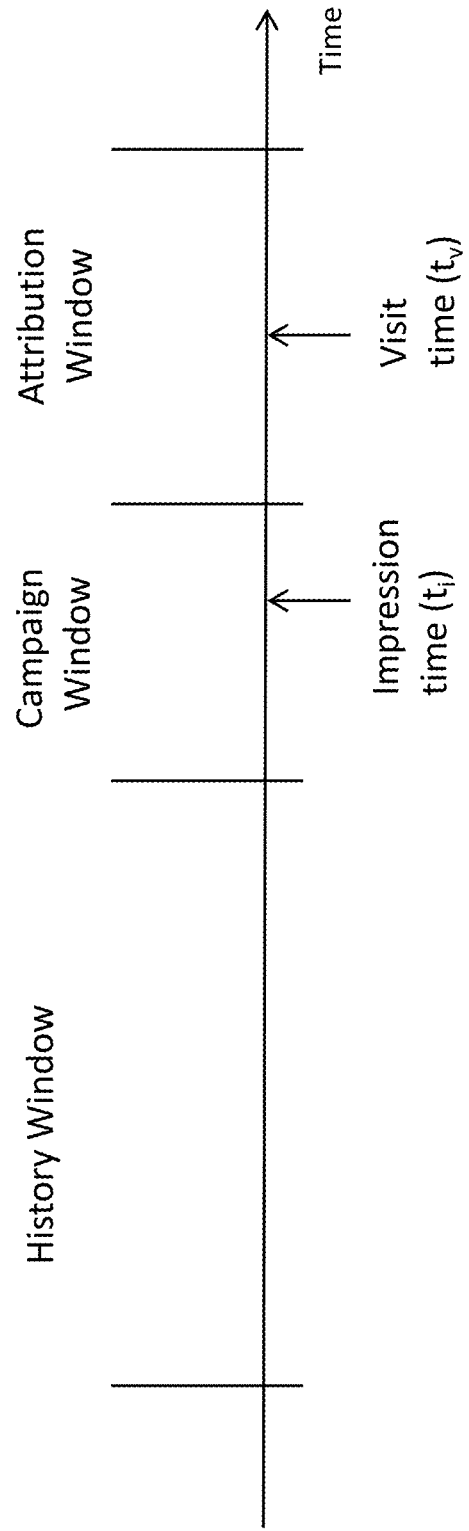
FIG. 6B-6E are diagrams illustrating various time windows for an information campaign according to certain embodiments.

Referring to FIG. 6B, the time windows include at least three time windows: a history window, a campaign window and an attribution window. The campaign window represents the timeframe when the campaign to deliver the document runs. The attribution window represents a limit on the time lag between the time of impression and the location visits where the location visits can still be attributed to the campaign. Note for impressions delivered at different times, the attribution windows can be sliding windows respectively defined for each impression time period, as discussed below and in co-pending U.S. patent application Ser. No. 15/289,104, filed Oct. 7, 2016, entitled "Method and Apparatus for Measuring Effect of Information Delivered to Mobile Devices," which is incorporated herein by reference in its entirety.

For example, as shown in FIG. 6A, an information campaign with a document identified with DocID D2750 runs from Feb. 21, 2017 to Feb. 28, 2017. A user with UID 56***845 was impressed on Feb. 24, 2017 with the ad, in response to a request identified by the request ID 0125785237. Another request associated with the user (request ID 0136819975) was later received on Mar. 1, 2017, which has location data indicating that the user was at the location identified as B123. Since the location B123 is associated with the campaign and the later received request is received during the attribution window, the later received request indicates a visit to the location and is recorded by the attribution module as a visit associated with the campaign.

In certain embodiments, a performance measure based on site visits (SA) can be determines as follows:

$$PM|_{SV}=CPV*SVRest*1000,$$

or $$PM|_{SV}=CPV*SVRest*(freqv/freqi)*1000,$$

where CPV is the cost per visit, SVRest is an estimated site visit rate, freqv is the average visits per visitor within an attribution window of time after impressions are made for a campaign, and freqi is the average impression frequency. Typically (freqv/freqi) is considered as a per campaign level constant, and CPM is primarily determined by estimated SVRest. The multiplier 1000 is used to map the performance measure to the CPM valuation model used for some of the other documents. When equal weights are given to each site visit, SVRest can be estimated by selecting a first number of unique mobile devices each having had at least one impression event with the document in the campaign window, discovering a second number of unique mobile devices among the first number of unique mobile devices, each of the second number of unique mobile devices having had at least one site visit event in the attribution window, and computing the SVRest as the ratio of the second number to the first number. In certain embodiments, if there are multiple exposures followed by a visit, only one visit is considered in the above SVR estimation. In certain embodiments, if there are multiple visits following an exposure, only one visit is considered in the above SVR estimation.

In certain embodiment, SVR is used as a measure of the likelihood that a user impressed with a document will visit one or more targeted locations during an observation window of time. Typically, the one or more locations are related to one or more brands associated with the information campaign. For example, for a McDonalds campaign, an SVR metric can be defined as the percentage of the impressed users who visited McDonalds restaurants within a predetermined attribution window. Note the targeted locations are defined by the scope of the information campaign, it could be nation-wide McDonalds restaurants, or just California McDonalds restaurants.

Figure 6C:
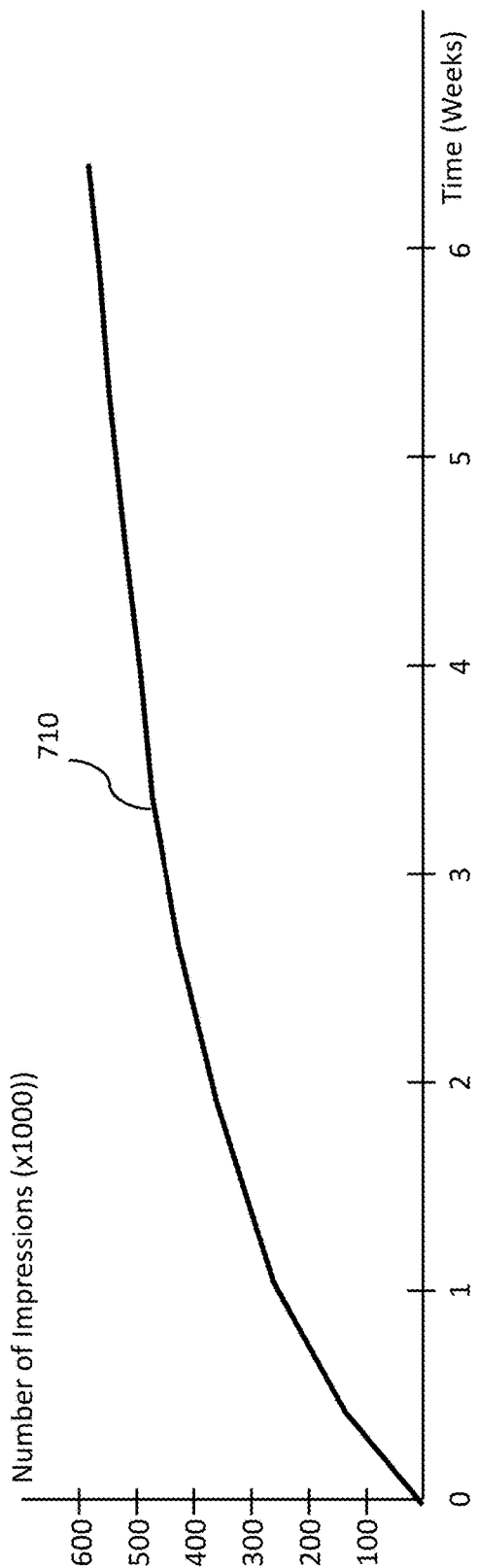
Figure 9A:
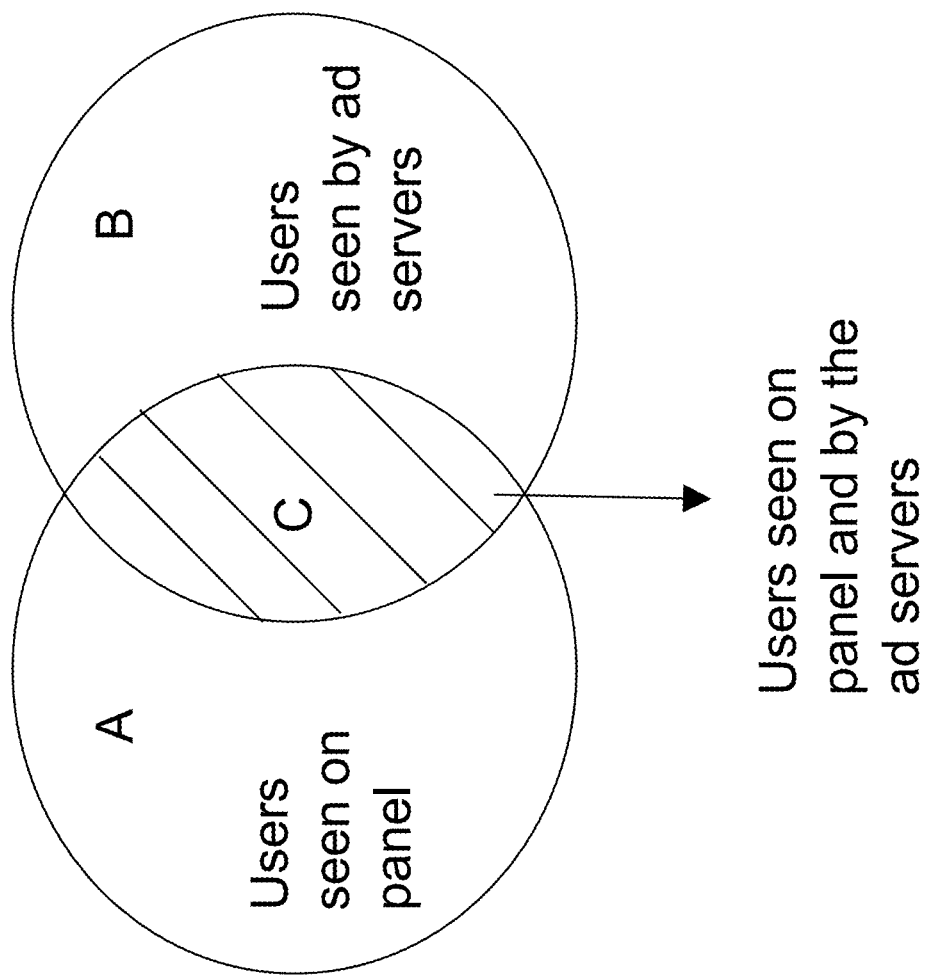
FIG. 9A is a diagram illustrating overlapping of qualified mobile devices (users) on a panel and qualified mobile devices (users) seen by the information system according to certain embodiments.

In certain embodiments, an information campaign flight (i.e., duration of an information campaign) is divided to include multiple windows, and location visit rate can be calculated for each window at first and then averaged over the multiple windows to arrive at the final SVR. For example, an information campaign flight may last several weeks, with an increasing number of mobile users becoming exposed to the information campaign as the number of impressions increase over the course of time, as illustrated by the curve 610 in FIG. 6C. Note that a mobile user can be exposed to the information campaign multiple times during the campaign flight, so the number of impressions in FIG. 9A do not necessarily equal to the number of exposed mobile users.

Figure 6D:
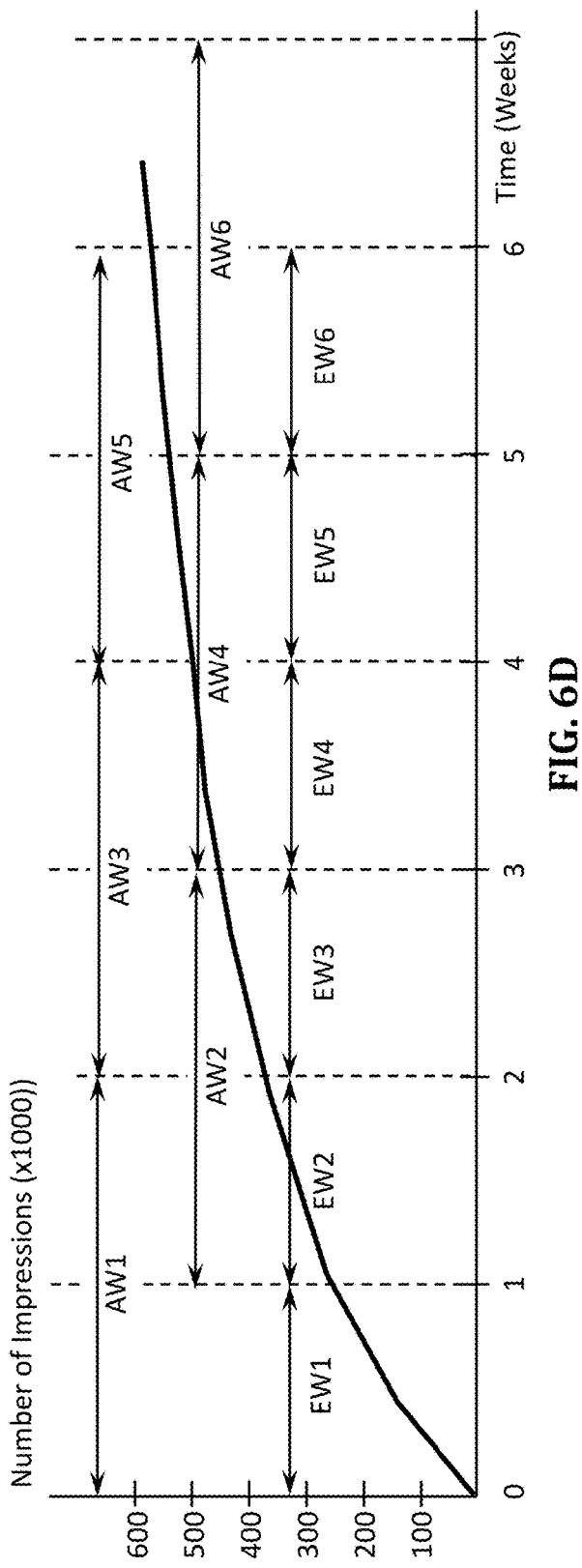

As shown in FIG. 6D, the flight of the information campaign is divided to include multiple exposure windows, e.g., EW1, EW2, . . . , and EW6, each is associated with a visit attribution window, e.g., AW1, AW2, . . . , and AW6, respectively. For each exposure window, a group of impressed users are determined based on information requests and document delivery during the exposure window, and an SVR is computed based on location visits during the associated visit attribution window. An overall SVR is computed by averaging over the multiple exposure windows.

Figure 6E:
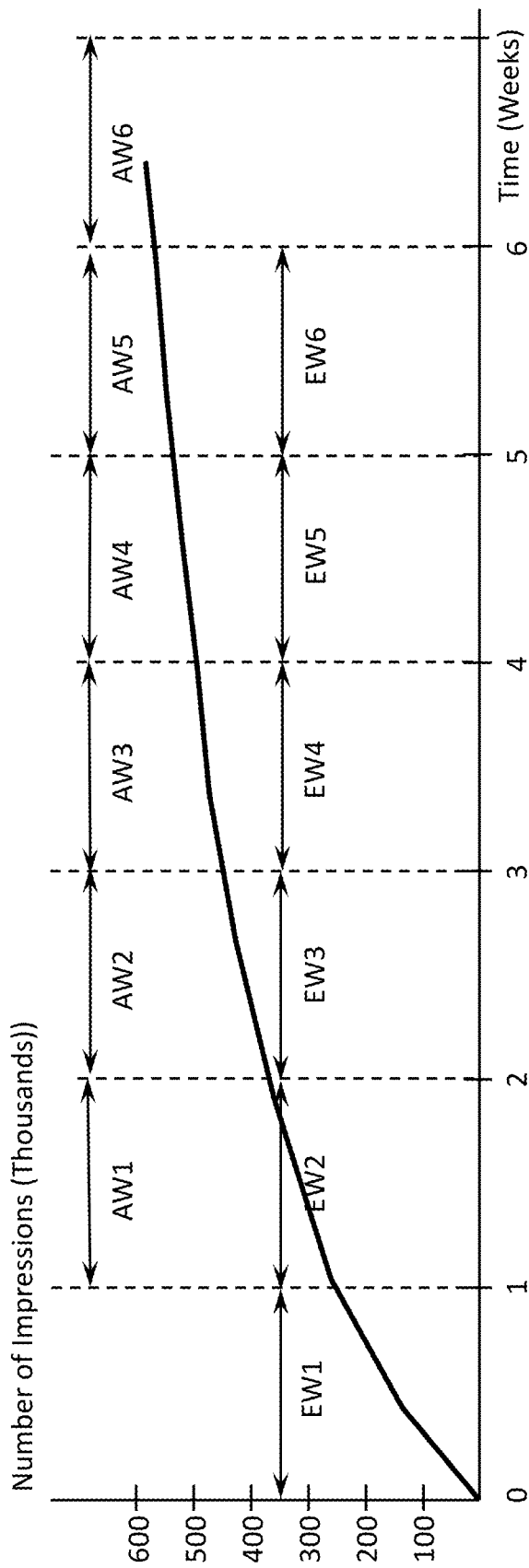

In FIG. 6D, each attribution window (e.g., AW1) is shown to overlap with its associated exposure window (e.g., EW1). In this case, location visits occurring during an exposure window (e.g., EW1) as well as afterwards are considered in the calculation of the location visit rate for the exposure window (e.g., $SVL_1$), even though the group of exposed users are determined at the end of the exposure window. In other embodiments, as shown in FIG. 6E, each attribution window (e.g., AW1) does not overlap with its associated exposure window (e.g., EW1). Thus, location visits occurring during an exposure window (e.g., EW1) are not considered in the calculation of the location visit rate for that exposure window (e.g., $SVL_1$).

In certain embodiments, the effect of an information exposure is made to decay over time. Thus, as the lag between information exposure and location visitation increases, the effect of the information exposure contributing to that visit decreases. To avoid over statement in the location visit rate calculation, effect on the SVR calculation from an exposed user can be made to fade as the information campaign proceeds unless that user is exposed to the information campaign again. In certain embodiments, a decay function is defined which determines the contribution of a user to the SVR calculation based on how long ago the user has been exposure to an information campaign.

In certain embodiments, the history window is used to identify users who had already visited the targeted locations before the starting of an information campaign. These users can be excluded from accounting so information providers only pay for visits most likely to have been initiated by the campaign, i.e., visits by people who did not visit the targeted locations in the history window, or the people who visited the targeted locations with very low frequency. In other embodiments, different weight can be given for new visits by new visitors and repeated visits by repeating visitors. Different weight can also be applied to different situation. For example, some retailers may be willing to pay higher rate for Tuesday visits than weekend visits.

Furthermore, different weights can be given to visits to different sites, or to different types of places at the same site. For example, some retailers may be willing to pay higher rate for a visit to a business center (BC) place than a visit to a business premise (BP) place, or vice versa. Thus, in general, the SVRest can be estimated as follows:

$$SVRest = \frac{(\text{Weighted\_Sum\_Unique\_MDs\_with\_SV\_in\_a\_Group})}{(\text{Number\_of\_Unique\_MDs\_in\_the\_Group})}$$

where MD stands for "Mobile Device" (thus, "MDs" stands for "Mobile Devices"), each unique MD counts as 1 in the weighted sum, and the weight for the MD in the weighted sum can be the weight associated with the highest weighted SV event for the unique MD. For example, if the MD had one SV event at a BP place associated with the document and another SV event at a BC place associated with the document, and the BC place is weighted higher than the BP place, the weight of the BC place is used as the weight for the MD in the weighted sum. The group of unique MDs can be the MDs impressed with the document during a campaign window.

Note location visits determined via information requests is not usually an actual representation of the effect of an information campaign. In a typical mobile network setup, a user's location (e.g., latitude and longitude, or LL) is shared with the information servers only when an information request associated with the mobile user is sent to the information servers. If a user's mobile device is not running apps that send information requests to the information servers at the time of the user's location visitation, this visit is not visible to the request processor 152 and thus is not counted by the evaluation module 170.

Figure 7:
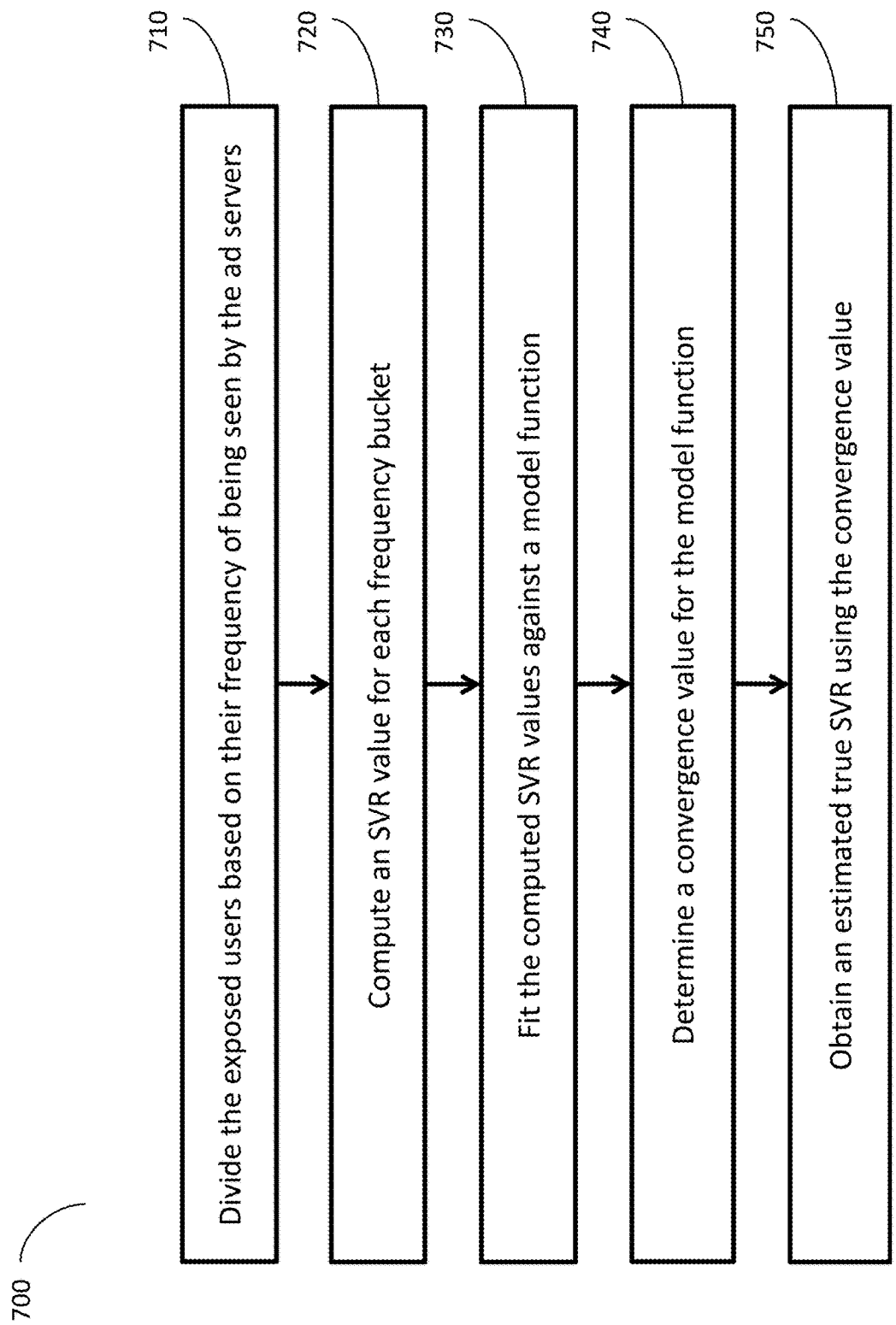
FIG. 7 is a flowchart illustrating a frequency modeling method to project an actual targeted response rate of mobile users exposed to an information campaign according to certain embodiments.

In certain embodiments, a frequency modeling method is used to project a more accurate count of mobile users who visited a targeted location after information exposure. FIG. 7 is a flowchart of a frequency modeling method 700 according to certain embodiments. As shown in FIGS. 5A and 7, the evaluation module may further include one or more frequency filters 550, which can be applied to the data in the data store 510 to divide the mobile users exposed to the document (710) into multiple frequency buckets each associated with a range of frequencies with which mobile user are seen by the system 150. Data associated with the different frequency buckets are stored in a data store 552 and used by the computation engine 554 to compute (720) an SVR value for each of the frequency buckets. In certain embodiments, the frequency may be measured as the number of days requests related to a mobile user show up at the system 150 during a predetermined time window (30 days). Thus, the mobile users who showed up only in one of the 30 days are less likely to be captured during their visits to a targeted location than mobile users who showed up in 10 of the 30 days. Thus, the SVR calculated from the mobile users in the lower frequency bucket would be lower than the SVR calculated from the mobile users in the higher frequency bucket, as shown in FIG. 8.

Figure 8:
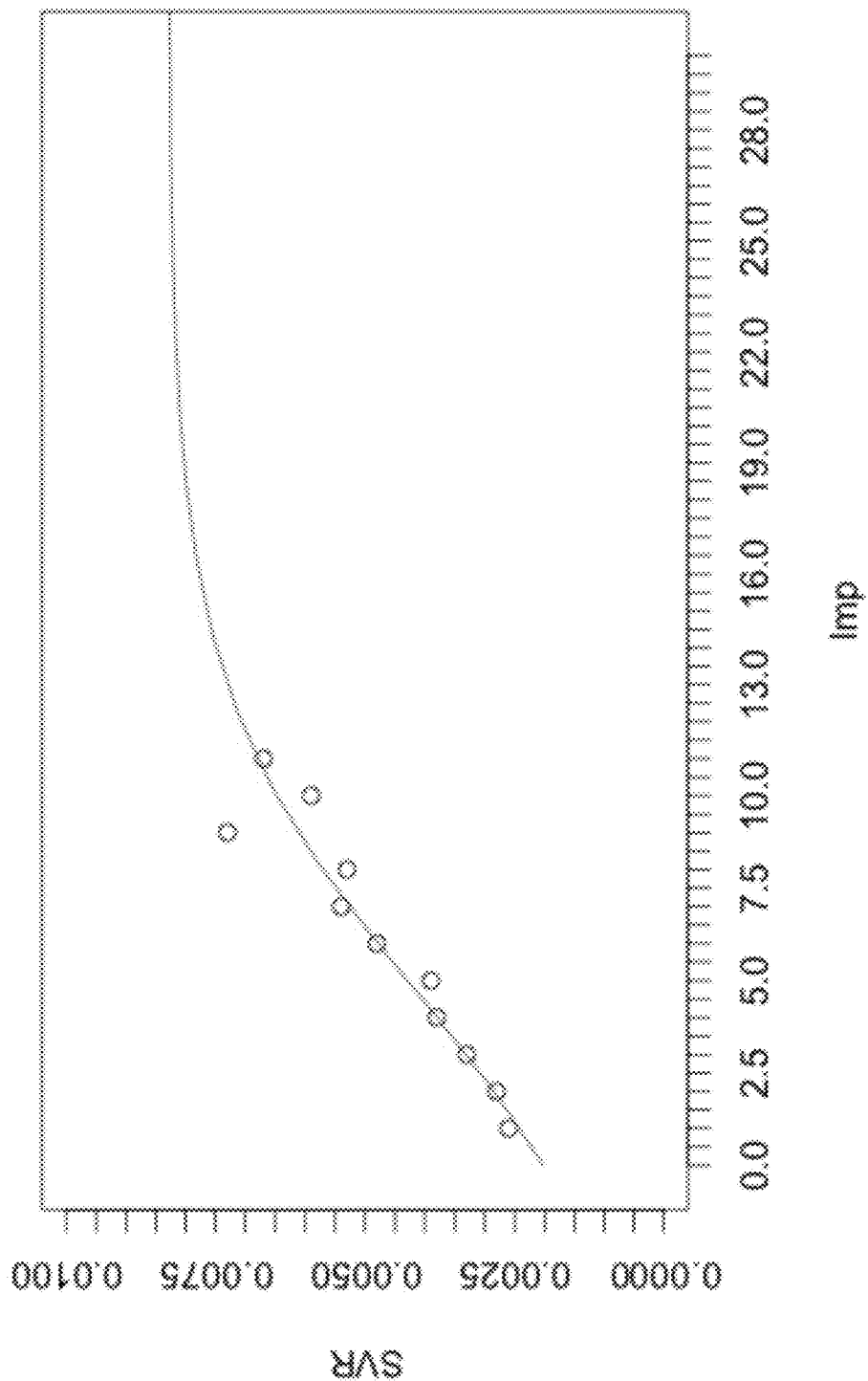
FIG. 8 is a plot illustrating targeted response rate data points calculated for respective frequency buckets being fitted to a model function.

Referring to FIGS. 7 and 8, the computation engine is further designed to fit (730) the computed SVR values against a model function. For example, the SVR data points in FIG. 8 can be fitted to the following exponential model function:

$$y=a/(1+\exp(-b*x+1)).$$

By fitting this function to the data points in FIG. 8, with x corresponding to the bucket frequencies (Imp) and y corresponding to the SVR values for the respective buckets, the parameters a and b can be determined. The computation engine then determines (740) a convergence value for the model function when x approaches infinity, which in this case is equal to a. The actual SVR for the entire group of mobile users can be estimated (750) to be this convergence value, which correspond to the projected situation when the document delivery system can see the mobile users all the times during the predetermined time window. In other words, the plot shown in FIG. 8 is extrapolated to find the SVR of a projected group of users who are seen an infinite number times on a information serving network.

In certain embodiments, a panel-assisted method is used to estimate the actual SVR. Using this method, an initial panel of qualified mobile users is used to derive a multiplier value that is used in later SVR calculations by the system 150. In certain embodiments, the panelists on the initial panel of users are qualified mobile users who have agreed to share their mobile device locations with the system 150 at a very high frequency (e.g., one data packet in every 20 minutes or 10 minutes or shorter) by installing and running a designated app (SDK) in the background on their mobile devices. The designated app on a mobile device is designed to provide the location (e.g., LL) of the mobile device at a predetermined frequency (e.g., every 10 minutes) in the form of, for example, data packets that also include identification of the respective mobile devices and other relevant information. Because of the high frequency of location sharing, most of the location visits by the panelists would be visible to the system 150, which receives two types of incoming data packets, i.e., information requests from, for example, mobile service providers and/or exchanges, etc., and data packets from panel mobile devices running the designated app.

FIG. 9 illustrates three groups of mobile users, Group A being the qualified mobile users on the panel, Group B being qualified mobile users who have been "seen" by the system 150 because of associated information requests, and Group C being mobile users who are in both group A and group B. Thus, Group C are mobile users who have been using apps that cause information requests to be sent to the system 150 and who also belong to the panel with the designated app running in the background of their mobile devices. Group C will be used in the panel-assisted method to determine the multiplier value for actual SVR estimation.

Figure 9B:
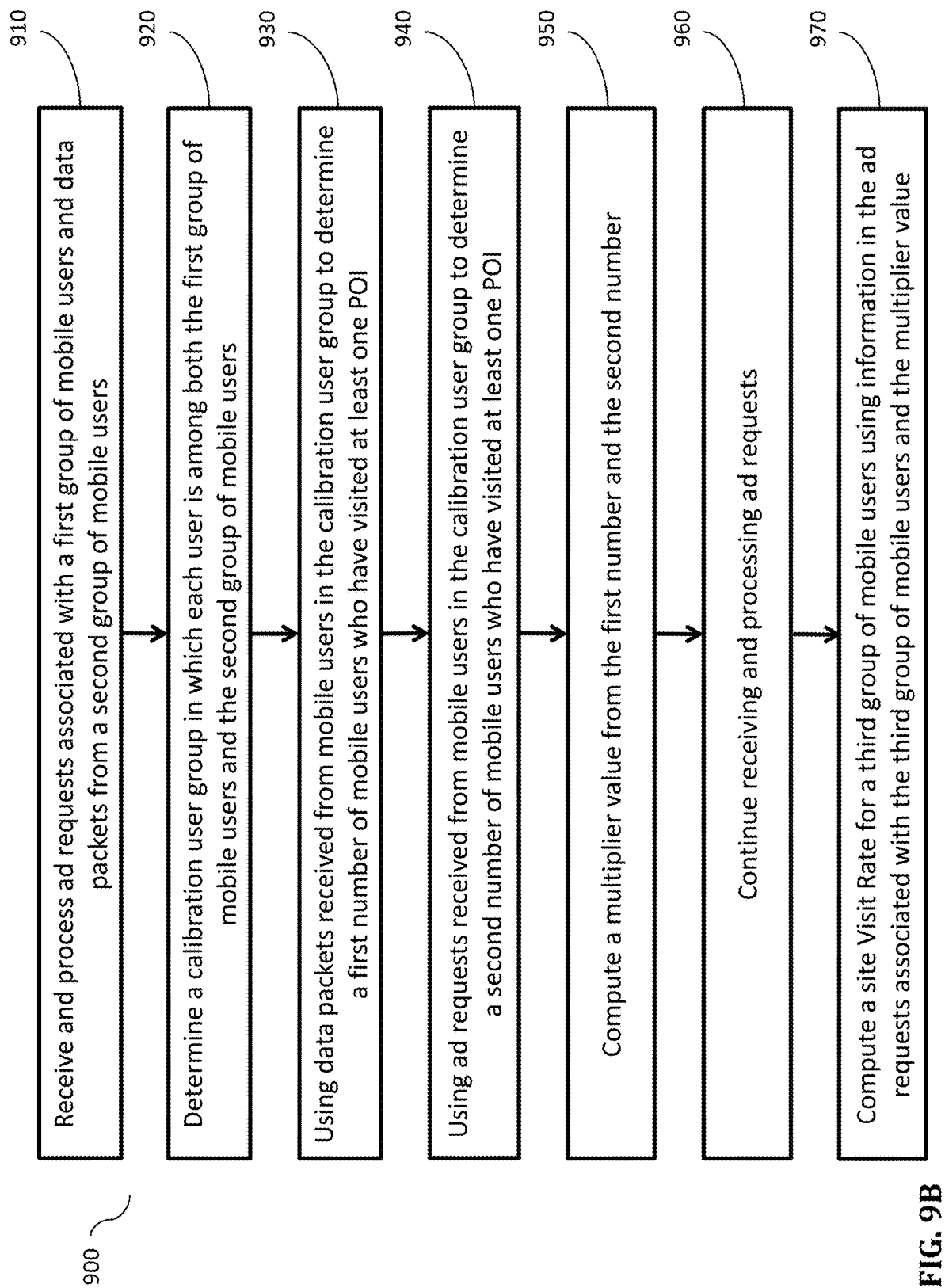
FIG. 9B is a flowchart illustrating a panel-assisted method of estimating an actual targeted response rate according to certain embodiments.

FIG. 9B illustrates a panel-assisted method 900 for estimating actual SVR according to certain embodiments. As shown in FIG. 9, using the method 900, the request processor 152 receives and processes information requests from a first group of mobile users (e.g., Group A), and further receives and processes (910) panel data packets from a second group of mobile users (e.g., Group B). The processed information requests and panel data packets are stored in the requests database 168, as discussed above. In certain embodiments, the evaluation module 170 may further include a calibration filter 560 that query the impression data in the data store 512 to look for a set of calibration mobile devices belong to a calibration user group (Group C) and then filter the data in the requests database 168 to obtain (920) request data and panel data associated with the calibration user group in which each user is among both the first set of mobile users and the second set of mobile users. The request data and panel data associated with the calibration user group are stored in the data store 562. The evaluation module 170 may further include site visit filter 562 that query the panel data in the data store 562 to determine (930) a first number of mobile users who have visited at least one of a set of calibration POI's selected for calibration purposes. The site visit filter 564 is then applied to the requests data in the data store 562 to determine (940) a second number of mobile users who have visited the at least one of the set of calibration POI's. Now the first number should be more representative of the actual number of mobile users in the calibration group who have visited the at least one of the set of calibration POI's because their locations are much more frequently shared with the system 150. The second number is the number of mobile users seen by the system 150 without the designated app. Thus the second number of mobile users are more representative of mobile users that can be tracked without the designated app. The first number and the second number associated with each of the set of calibration POI's are stored in the data store 566.

In certain embodiments, the evaluation module 170 further includes a computation engine 570 configured to use the first number and the second number to compute (950) a calibration factor as an approximate representation, for any group of exposed mobile users, the ratio of the actual number of location visits to the count of location visits that can be detected by the system 150 using only information requests. In certain embodiments, this calibration factor (SVR_multiplier) can simply be the ratio of the first number over the second number. This SVR_multiplier is stored in the data store 566 and is used by the computation engine 570 in later SV based performance measure calculations.

In certain embodiments, any device id (in the form of IDFA, GIDFA) seen from regular information requests and panel data packets over a time window of, for example, 90 days, are stored in the requests log 168 as key-value locations. The key-value locations for information requests and panel data packets serve as the user location for regular users and panel users respectively. The users who are in both panel user location and regular user location are referred to above as forming the calibration user group. In certain embodiments, a time window (e.g., 1 week) is used as a calibration window, in which the first number of users and the second number of users are counted based on data packets from the designated app and regular information requests received by system 150, respectively.

Thus, as the information delivery system 150 continues to receive and process (960) information requests, the computation engine 570 computes (970) a predicted SVR for future exposed mobile users as follows:

$$SVR = SVR\_observed * SVR\_multiplier$$

where SVR_observed is observed SVR based on regular information request signals captured on the information servers, as defined in the above, i.e., $$SVRest = \frac{(Weighted\_Sum\_Unique\_MDs\_with\_SV\_in\_a\_Group)}{(Number\_of\_Unique\_MDs\_in\_the\_Group)}$$

The SVR multiplier can be determined at different levels such as region-wise, verticals, brands, and campaigns, as discussed below. In certain embodiments, a different SVR_multiplier is estimated for different business vertical (i.e., a set of related brands). For that purpose, the calibration POI set (i.e., one or more target locations used to measure the SVR) is selected such that only the POIs belonging to one particular vertical or brand (e.g., McDonalds') is selected to determine that SVR multiplier for that particular vertical or brand.

To determine a region-wise multiplier, the calibration POI set is selected to include all major brands in a geographical region, which can be a country (e.g., United States), a state (e.g., California), a city (e.g., New York), or other municipalities or regions. With such large amount of data, the region-wise (e.g., country-level) multiplier can remain stable across an extended period of time. The region-wise multiplier, however, does not account for specific aspects of information campaigns that may directly influence the SVR, such as target audience and brand.

To determine a vertical-level multiplier, the calibration POI set is selected to include only POIs belonging to a vertical, e.g., a set (e.g., a category) of brands nationwide. The vertical-level multiplier improves upon the country-level multiplier by accounting for potential differences in location visitation among visitors at different types of locations, i.e. restaurants vs retailers. However, the brands within a vertical may exhibit different SVR patterns from each other.

To determine a brand-level multiplier, the calibration POI set is selected to include only POIs associated with one specific brand. As information campaigns are typically associated with brands, the brand-level multiplier allows for a direct multiplication. However, issues of sparse data begin to appear at this level, especially for international brands. Moreover, the brand-level multiplier is more subject to fluctuation than either the vertical-level or country-level multipliers, given the defined window of information exposure.

A campaign-level multiplier is equivalent to a brand-level multiplier, except that calculations are restricted to targeted user group defined by a specific information campaign. The campaign-level multiplier best captures the specific context of an individual campaign, but suffers sometimes from lack of scale.

Thus, each succeeding level captures missed visits more accurately, but may suffer from more fluctuation due to lack of scale.

Within each information campaign, there may be several document groups each associated with one or more brands, for which the corresponding multipliers can be applied. For example, for an information campaign for a brand, there may be a document group targeting mainly adult male mobile users, a document group targeting mainly adult female mobile users, a location-based document group (LBA) targeting mainly mobile users who are determined to be in one or more specified places, and on-premise document group targeting mainly mobile users who are determined to be on the premise (or business center) associated with the brand. In certain embodiments, a two step-process is used to derive the SVR for this information campaign. First, a SVR multiplier is determined for each of the document groups, except the location-based document groups (LBAs) and the on-premise document groups, which are excluded from the need for an SVR multiplier because these audiences have already been previously seen visiting the locations via information requests and panel data packets, thus are less likely to exhibit lost visits. Afterwards, a weighted average can be taken to derive the final SVR.

This method is applicable to information campaigns with both low and high observed SVRs. For the former type, the calculation can simplify be performed by applying the brand-level multipliers due to the lack of LBAs. For instance, consider an information campaign for Subway with an observed SVR of 0.39 percent. For this campaign, using the country-level multiplier of 3.9 results in a SVR of 1.54 percent, which is likely an underestimation given historical data. Indeed, panel-based analysis indicates that request-based tracking is underestimating count of visit to Subway by a factor of approximately 16. Because this campaign has no LBAs, a brand-level multiplier of 15 can simply be applied to the observed SVR to yield 5.86 percent, a result more in line with expectations.

In another example, consider an information campaign for four retailers—Target, Walgreens, CVS, and Rite Aid—with a relatively high observed SVR of 7 percent. Using the country-level multiplier SVR estimation, the reported SVR would be overestimated at 28 percent. Using the new method with brand-level multipliers and exclusion of LBAs, SVR is calculated to be a more reasonable 16 percent. Use of brand-level multipliers also yields more insight regarding location visitation patterns at these brands.

In certain embodiments, the evaluation module 170 includes both the components for panel-based SVR estimation and components for frequency-bracket based SVR estimation, and selects the result from one of the techniques based on a few factors, such as: (1) whether there are panel data available; whether there are sufficient request data to divide into a sufficient number of frequency buckets, etc. The evaluation module 170 could also take an average of the SAR estimates from both techniques.

In certain embodiments, the computation engine 570 is configured to model the SVR estimation as a typical Bernoulli process, where each user has a given probability of p to visit a location. The confidence interval for p estimation is therefore:

$$\pm z\sqrt{\hat{p}(1-\hat{p})/n}$$

where z is 1.96 for 95% confidence level, $\hat{p}$ is the observed location visitation rate SVR. In the case of applying a multiplier to the observed SVR for projection purpose, the same multiplier is applied to the confidence interval.

Figure 10:
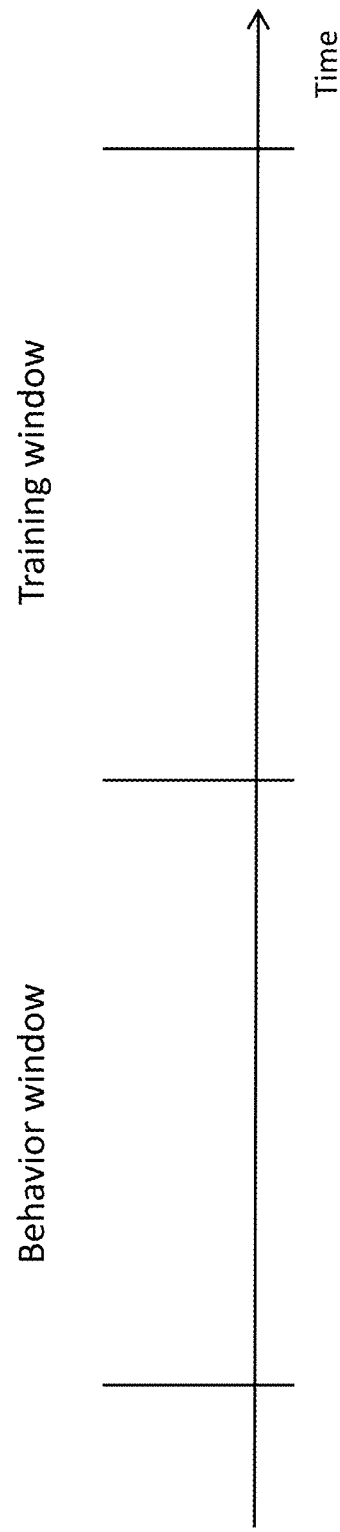
FIG. 10 is a diagram illustrating time windows for deriving a model function for predicting targeted off-line responses according to certain embodiments.

In further embodiments, the valuation module 170 is further configured to estimate SVR using user level behavior data. As illustrated in FIG. 10, for each user observed by system 150, its location history is observed during a first period of time (observation window), which defines a set of features forming a feature vector X. In a second period of time (i.e., the adjacent training window), if the same user is observed to have visited one of the targeted locations, the targeted y=1, otherwise y=0. Multiple users' behavior data are thus obtained and are used to fit an estimation model y=f(X), which predicts a visitation likelihood y given a known behavior feature vector X for a user. In one embodiment, the feature vector X is defined as (x1, x2, . . . , xn), where xi is the normalized visitation frequency by the user to locations associated with each of a set of n different documents, i.e., $$xi = SVi/SVAi$$

where SVi is the visitation frequency by the user related to the $i^{th}$ document within the observation window, and SVAi is the average visitation frequency of a group of users related to the $i^{th}$ document. Index i is in the range of (1, 2, . . . , n) where n denotes the number of documents (or brand) used to represent a user's location feature space. In this setup, the estimation model y=f(X) is to capture the user's behavior pattern's correlation with future location visitation. The model fitting could be realized using either linear models such as Logistic Regression or nonlinear models such as neural network models.

Figure 11A:
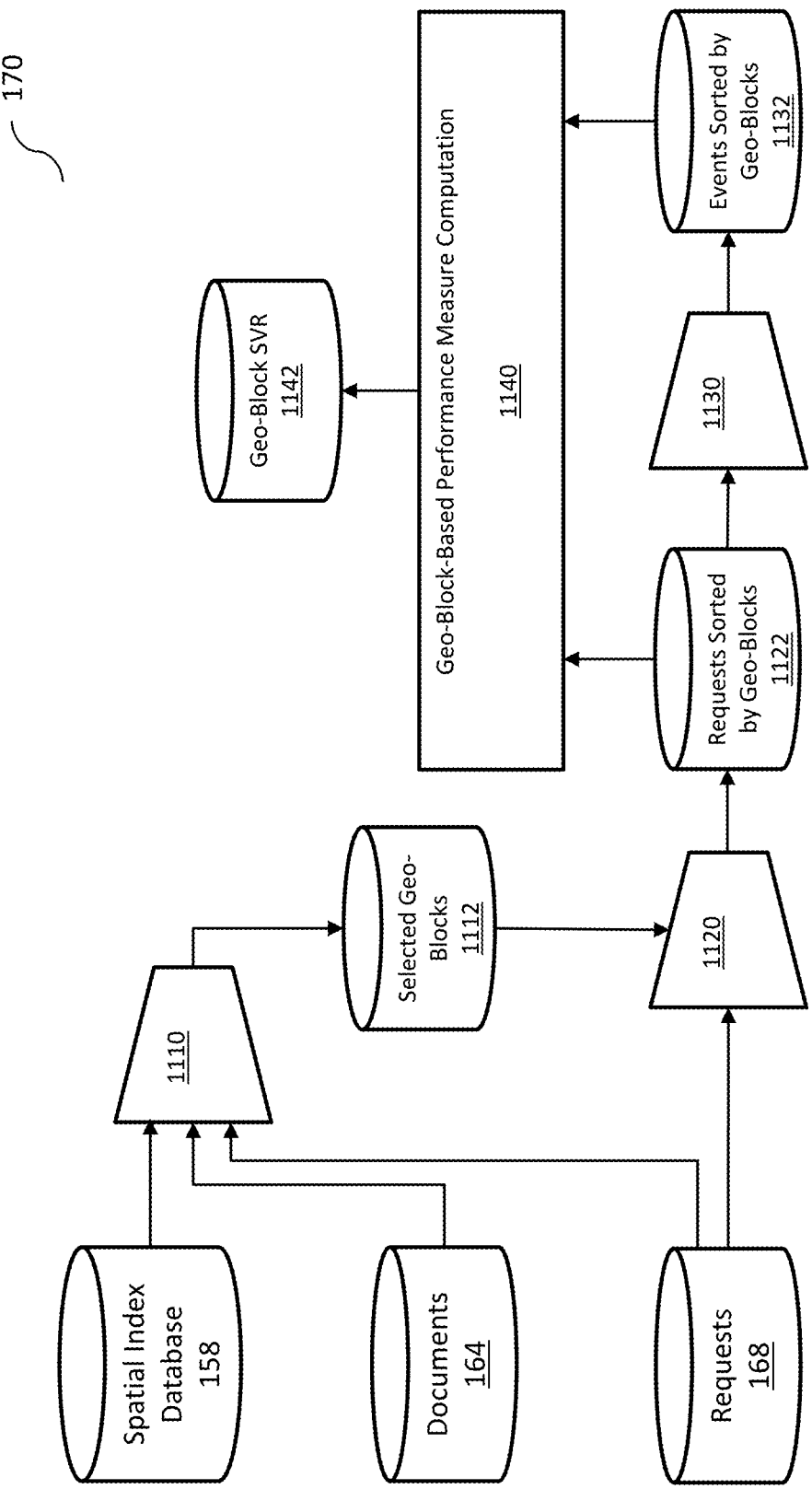
FIG. 11A is a block diagram illustrating certain functional units in the evaluation module in the information system according to further embodiments.

In further embodiments, an SVR could be estimated for each of a plurality of geo-blocks in the vicinity of for any given group of branded locations associated with the document. As shown in FIG. 11A, the evaluation module 170 may further include a geo-block filter 1110 configured to filter the geo-blocks in the spatial index database 158 for a plurality of geo-blocks related to the document. This can be done by building a query using the information associated with the document, such as name/brand/category, targeted demographic, targeted locations, etc., and search the spatial index database 158 for geo-blocks with meta data matching the query. The evaluation module 170 further includes a request filter 1120 that filters the annotated request in the requests database 168 for relevant requests that are annotated with the each geo-block among the matching geo-blocks, and stores the data associated with the relevant requests together with the each geo-block in a data store 1122, as shown in FIG. 11B. As discussed above, a request annotated with a geo-block indicates a detected location of an associated mobile device having been in the geo-block.

The evaluation module 170 further includes a site visit filter 1130 that filters the annotated request in the data store 1122 for relevant requests that are annotated with at least one place associated with the document indicating a site visit event, and stores the data associated with the site visit events in a data store 1132, as shown in FIG. 11B. The evaluation module 170 further includes a computation engine 1140 configured to compute a site visit rate (SVR) each of the matching geo-blocks and stores the SVR in the geo-block SVR store 1142. In certain embodiments, the SVR for each geo-block is computed as the ratio of the number of unique mobile devices having visited both the geo-block and a site associated with the document and the number of unique mobile devices having visited the geo-block. Such an SVR indicates a likelihood of a visit to the site by a mobile user detected to be in the geo-block and is thus used to derive a performance measure of the document corresponding to the specific geo-block as follows:

$$PM|_{SV} = CPV * SVRest|_{GB} * 1000$$

where $SVRest|_{GB}$ is the SVR estimate for the specific geo-block.

Referring back to FIGS. 4A and 4B, in certain embodiments, the ranking unit 405 in the information server 156 is configured to determine the KPI for each of the one or more matching document by first determining the type of performance measure or pricing model associated with the document. For example, if the performance measure is CPM-based, the performance measure can simply be the price a sponsor of the document has offered to pay for each impression and the KPI can be equal to the performance measure. If the performance measure is CPC-based or CPI-based, the ranking unit 405 can use the PM|CC value or the PM|SA value determined by the evaluation module 170, as discussed above.

If the performance measure is CPV-based, the ranking unit 405 would at first determine whether the annotated request is annotated with a geo-block having a $PM|_{SV}$ or $SVRest|_{GB}$ value determined for that geo-block. If so, the ranking unit 405 may proceed to determine the KPI using the $PM|_{SV}$ or $SVRest|_{GB}$ value associated with the geo-block. On the other hand, if the annotated request is not annotated with such a geo-block, the ranking unit 405 would use the $PM|_{SV}$ value computed using the panel multiplier or frequency bucket techniques, whichever one is produced by the evaluation module 170. The ranking unit 405 may determine the KPI as the $PM|_{SV}$ value multiplied by a weight that is based on the type of place related to the document in the annotated request and/or the time stamp of the annotated request. For example, different weights can be given to visits to different sites, or to different types of places at the same site. For example, some retailers may be willing to pay higher rate for a visit to a business center (BC) place than a visit to a business premise (BP) place, or vice versa. Also, different weight can also be applied to different time stamps. For example, some retailers may be willing to pay higher rate for Tuesday visits than weekend visits.

Figure 4C:
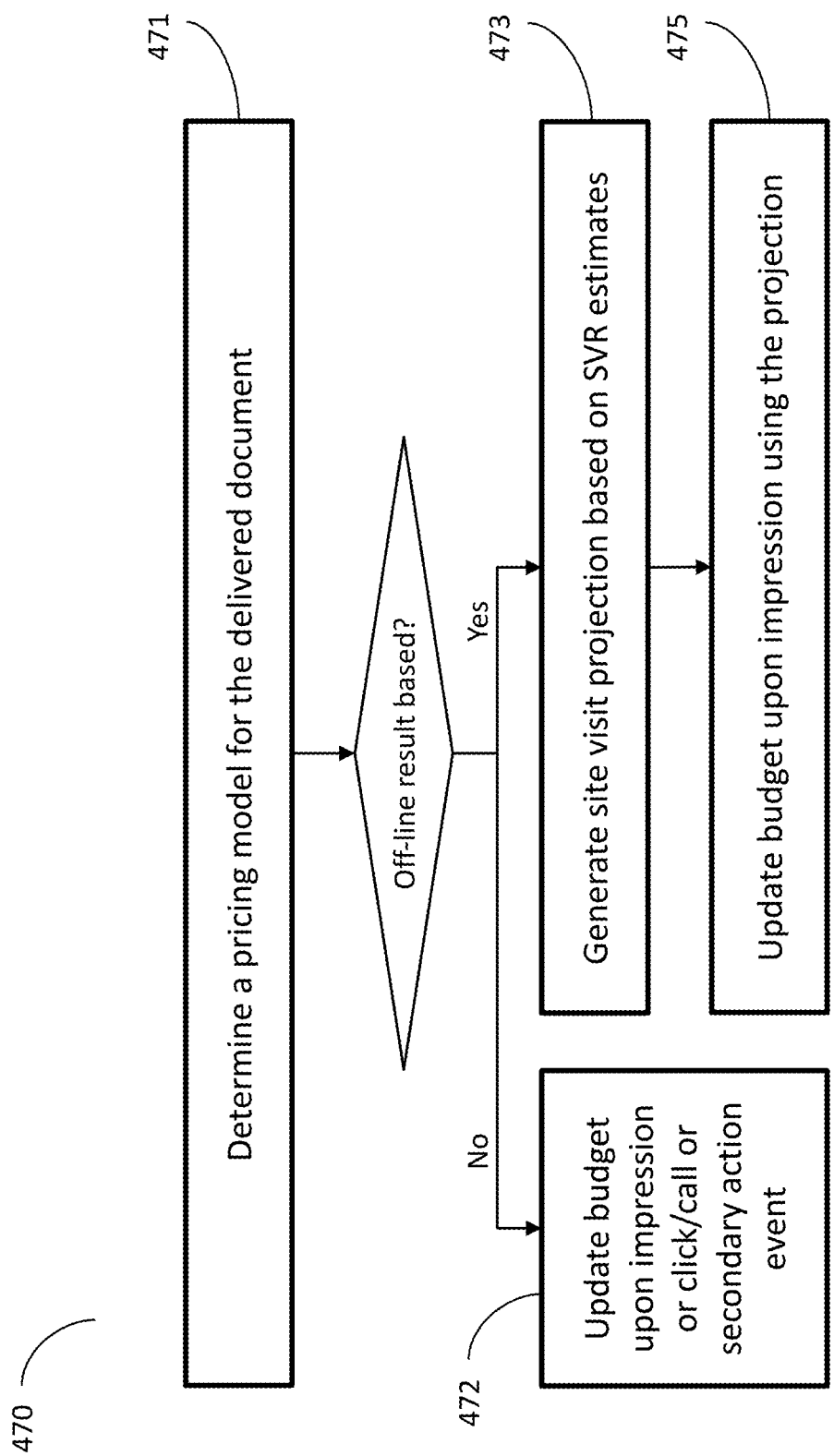
FIG. 4C is a flowchart illustrating a method performed by a volume control unit in the information server according to certain embodiments.

In certain embodiments, as shown in FIGS. 4A through 4C, the information server 154 further includes a budget control function in the volume control unit 409, which adjusts or updates (470) the associated campaign budget based on the corresponding pricing model, and removes documents running out of budget from the documents pool. Thus, the volume control unit 409 first determines (471) what pricing model is associated with the delivered document. For on-line result focused pricing models such as CPM, CPC, or CPI, this can be done after the information server 154 receives (460) signals indicating an impression/click/call/SA event, which typically happens within seconds or minutes after the delivery of the document. The related budget is updated (472) by deducting the cost for the impression/click/call/SA from the budget. For off-line result, it is tricky because a site visit may happen hours or days after the impression. By the time when it happens, the budget for the campaign may have already run out, or the campaign window is closed and not enough site visits are produced to make up for the cost of the campaign.

Thus, in certain embodiment, the volume control unit 409 is configured to generate (473) a site visit projection based on the SVR estimates upon receiving signals indicating the CPV-based document has been impressed, instead of waiting until a site visit actually occurs. The projection can be the cost per visit offered by the sponsor of the document multiplied by the estimated SVR used in the ranking module 405 to estimate the KPI. It may be further multiplied by the weight used by the ranking unit 405. The volume control unit 409 then updates (475) the related budget by deducting the projection from the budget.

In certain embodiments, one or more computers/servers 120 are used to provide each, some or all of the request processor 152, the information server, and the various filters and computation engines in the evaluation module.

Figure 12:
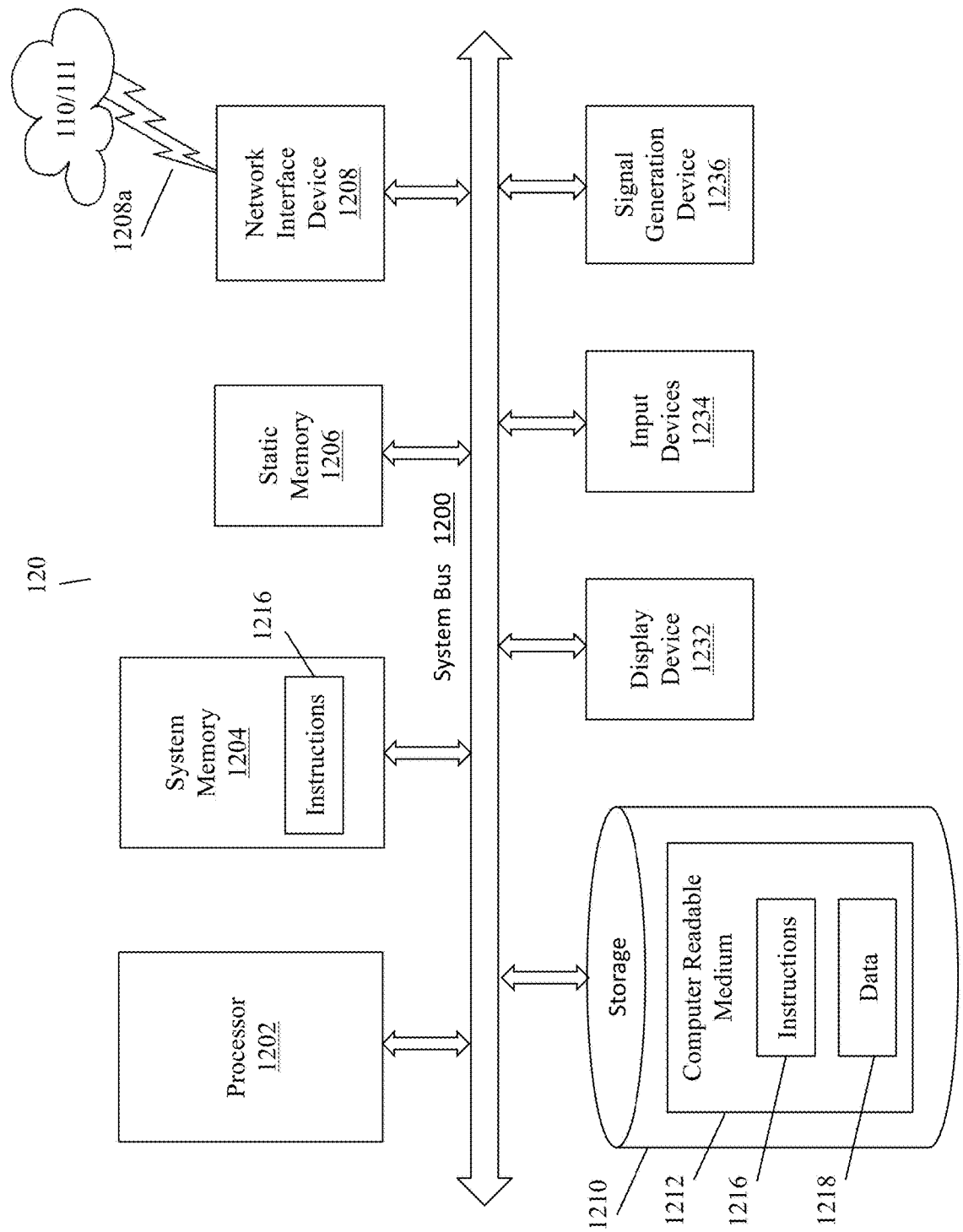
FIG. 12 is a diagrammatic representation of a computer/server that performs one or more of the methodologies and/or to provide part or all of the information system according to embodiments.

FIG. 12 illustrates a diagrammatic representation of an exemplary computer/server 120 that can be used to provide any one or more components in the system 150 by executing proprietary software instructions. The computer/server 120 may operate as a standalone device or as a peer computing device in a peer-to-peer (or distributed) network computing environment. As shown in FIG. 12, the computer/server 120 includes one or more processors 1202 (e.g., a central processing unit (CPU), a graphic processing unit (GPU), and/or a digital signal processor (DSP)) and a system or main memory 1204 coupled to each other via a system bus 1200. The computer/server 120 may further include static memory 1206, a network interface device 1208, a storage unit 1210, one or more display devices 1230, one or more input devices 1234, and a signal generation device (e.g., a speaker) 1236, with which the processor(s) 1202 can communicate via the system bus 1200.

In certain embodiments, the display device(s) 1230 include one or more graphics display units (e.g., a plasma display panel (PDP), a liquid crystal display (LCD), a projector, or a cathode ray tube (CRT)). The input device(s) 1234 may include an alphanumeric input device (e.g., a keyboard), a cursor control device (e.g., a mouse, trackball, joystick, motion sensor, or other pointing instrument). The storage unit 1210 includes a machine-readable medium 1212 on which is stored instructions 1216 (e.g., software) that enable anyone or more of the systems, components, methodologies or functions described herein. The storage unit 1210 may also store data 1218 used and/or generated by the systems, components, methodologies or functions, including data in any, part, some, or all of the POI data 151, the map data 152, the spatial index database 158, the request log 168, the impression log 164, click/call log 166, the data filed 171, the segment database 174, the search index 925, etc. The instructions 1216 (e.g., software) may be loaded, completely or partially, within the main memory 1204 or within the processor 1202 (e.g., within a processor's cache memory) during execution thereof by the computer/server 120. Thus, the main memory 1204 and the processor 1102 also constituting machine-readable media.

While machine-readable medium 1212 is shown in an example implementation to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1216) for execution by the computer/server 120 and that cause the computing device 1100 to perform anyone or more of the methodologies disclosed herein. The term "machine-readable medium" includes, but not be limited to, data repositories in the form of solid-state memories, optical media, and magnetic media. In certain embodiments, the instructions 1216 and/or data 1218 can be stored in the network 100 and accessed by the computer/server 120 via its network interface device 1208, which provides wired and/or wireless connections to a network, such as a local area network 111 and/or a wide area network (e.g., the Internet 110) via some type of network connectors 1280a. The instructions 1216 (e.g., software) and or data 1218 may be transmitted or received via the network interface device 208.

We claim:

1. A system for processing information requests from a packet-based network, comprising:
    a request processor configured to receive requests associated with a first plurality of mobile devices from one or more servers in the packet-based network, each of the requests including location data and non-location data derived from signals transmitted by an associated mobile device, the request processor being further configured to derive, for each respective request of at least some of the requests, location features based at least on respective location data included in the respective request, the request processor being further configured to update a requests database with the location features and respective non-location data included in the respective request;
    an information server configured to select and transmit information in response to determination to fulfill the respective request, the information server including a query builder configured to build a search query based on at least some of the location features and the respective non-location data and a search engine configured to search a document database using the search query and to output matching documents, the information server further including a ranking unit configured to select a document from the matching documents to fulfill the respective request and a network interface configured to transmit data related to a selected document to the packet-based network, the selected document being configured to display a link upon being impressed on a respective mobile device associated with the respective request, which link when clicked via an input mechanism of the respective mobile device causes the respective mobile device to display additional information or to place a call, the information server being further configured to receive signals indicating events on the respective mobile device related to the selected document, the one or more events including one or more of an impression of the selected document and a click of the link, the information server further including or having access to an events database for storing data associated with the one or more events;
    an evaluation module configured to determine at least one performance measure for each of a plurality of information documents in the document database using at least data in one or more of the requests database and events database, the plurality of information documents including a first document using an impression-based performance measure, a second document using a click/call-based performance measure, and a third document using an off-line site-visit-based performance measure; and
    wherein the matching documents include one or more documents of the plurality of documents,-and the ranking unit is further configured to rank the matching documents based at least on their respective performance measures, wherein the selected document is selected based on its rank among the matching documents and on an associated budget, and wherein the information server further includes a volume control module configured to derive an off-line site visit projection in response to the selected document being a document using an off-line site-visit-based performance measure and having been impressed on the respective mobile device, and to adjust a budget associated with the selected document based on the off-line site visit projection.

2. The system of claim 1, wherein the location features include one or more places where the respective mobile device is determined to be at a time of the respective request, and wherein the selected document is associated with at least one of the one or more places.

3. The system of claim 1, wherein the location features include identification of a first geo-block associated with the selected document, wherein the evaluation module is configured to determine a site visit rate for each of at least one geo-block associated with the selected document, and wherein the off-line site-visit-based performance measure for the selected document is determined based at least on a site visit rate for the first geo-block, each of the at least one geo-block being a geographical region having one or more natural boundaries.

4. The system of claim 1, wherein the location features include identification of a first geo-block associated with the selected document, wherein the evaluation module is configured to determine a site visit rate for each of at least one geo-block associated with the selected document, and wherein the off-line site visit projection is determined based at least on the site visit rate for the first geo-block, each of the at least one geo-block being a geographical region having one or more natural boundaries.

5. The system of claim 1, wherein the location features include identification of a geo-block and wherein the volume control module is configured to derive the off-line site visit projection using at least data associated with the geo-block, the geo-block being a geographical region having one or more natural boundaries.

6. The system of claim 5, wherein the evaluation module is further configured to determine, using the data in the requests database, a ratio of a number of unique mobile devices having visited the geo-block and one or more places associated with the selected document to a number of unique mobile devices having visited the geo-block, and wherein the data associated with the geo-block includes a visitation rate estimated using the ratio.

7. The system of claim 1, wherein the evaluation module includes a first filter configured to search the events database to obtain data of impression events associated with each respective document of the plurality of documents and a first computation engine configured to generate the impression-based performance measure for the first document based on data of impression events associated with the first document, the evaluation module further including a second filter configured to search the events database to obtain data of click/call events associated with the second document, and a second computation engine configured to generate the click/call-based performance measure for the second document based on the data of click/call events associated with the second document, the evaluation module further including a third filter configured to search the requests database to obtain data of site visits events related to the third document, the evaluation module further including a computation engine configured to generate the off-line site-visit-based performance measure for the third document using the data of site visits events.

8. The system of claim 7, wherein the evaluation module further includes one or more frequency filters configured to divide mobile devices impressed with the third document into multiple frequency buckets each associated with a range of frequencies with which mobile user are seen by the system via information requests, and a computation engine configured to compute a site visit rate (SVR) value for each frequency bucket based on the data in the requests database and the data of site visits events, the computation engine being further configured to fit the SVR values of the multiple frequency buckets to a model function and to determine a convergence value for the model function, and wherein the off-line site-visit-based performance measure for the third document is generated using the convergence value.

9. The system of claim 7, wherein the request processor is further configured to receive panel data packets from a second plurality of mobile devices, to derive location features from the panel data packets and to annotate panel data in the panel data packets with respective to location features to generate annotated panel data sets, the request processor being further configured to store the annotated panel data sets in the requests database, wherein the evaluation module further includes one or more fourth filters to query the event database to determine a third plurality of mobile devices that are impressed with the third document and that are in the first plurality of mobile devices and in the second plurality of mobile devices, and one or more fifth filter to determine a first number of mobile devices having visited one or more calibration places using panel data sets associated with the third plurality of mobile devices, a second number of mobile devices having visited the one or more calibration places using location features derived for certain requests associated with the third plurality of mobile devices, and a calibration multiplier using the first number and the second number.

10. The system of claim 9, wherein the off-line site-visit-based performance measure for the third document is determined using the calibration multiplier.

11. A method performed by one or more computer systems to process information requests from a packet-based network, each of the one or more computer systems including at least one processor, comprising:

receiving, by a processor of the one or more computer systems, from one or more servers in the packet-based network, requests associated with a first plurality of memory devices communicating with the packet-based network, each of the requests including location data and non-location data derived from signals transmitted by an associated mobile device;

for each respective request of at least some of the requests, generating, by a processor of the one or more computer systems, location features based on respective location data included in the respective request;

updating, by a processor of the one or more computer systems, a requests database with the location features and respective non-location data included in the respective request;

building, by a processor of the one or more computer systems, a search query based on at least some of the location features and the respective non-location data in response to determination to fulfill the respective request;

searching, by a processor of the one or more computer systems, a documents database using the search query to output matching documents;

selecting, by a processor of the one or more computer systems, one of the matching documents to fulfill the respective request;

transmitting, data related to the selected document to the packet-based network, the selected document being configured to display a link upon being impressed on a respective mobile device associated with the respective request, which link when clicked via an input mechanism of the respective mobile device causes the respective mobile device to display additional information or to place a call;

receiving, by a processor of the one or more computer systems, signals indicating one or more events on the respective mobile device related to the selected document, the one or more events being one or more of an impression of the selected document and a click of the link;

storing, by a processor of the one or more computer systems data associated with the one or more events in an events database;

determining, by a processor of the one or more computer systems, at least one performance measure for each of a plurality of information documents in the document database using at least data in one or more of the requests database and events database, the plurality of information documents including a first document including an impression-based performance measure, a second document using a click/call-based performance measure and a third document using an off-line site-visit-based performance measure, wherein the matching documents include one or more documents of the plurality of documents, wherein selecting one of the matching documents to fulfill the respective request includes ranking the matching documents based at least on their respective performance measures, and wherein the selected document is selected based on its rank among the matching documents and on a budget associated with the selected document;

generating, by a processor of the one or more computer systems, an off-line site visit projection in response to the selected document being a document using an off-line site-visit-based performance measure and having been impressed on the respective mobile device; and adjusting the budget associated with the selected document based on the off-line site visit projection.

12. The method of claim 11, wherein the location features include identification of one or more places where the respective mobile device is determined to be at a time of the respective request, and wherein the selected document is associated with at least one of the one or more places.

13. The method of claim 11, wherein the location features include identification of a first geo-block associated with the selected document, wherein the method further comprises determining a site visit rate (SVR) for each of at least one geo-block associated with the selected document, and wherein the off-line site-visit-based performance measure for the selected document is determined based on the SVR for the first geo-block, each of the at least one geo-block being a geographical region having one or more natural boundaries.

14. The method of claim 11, wherein the location features include identification of a first geo-block associated with the selected document, wherein the method further comprises determining a site visit rate for each of at least one geo-block associated with the selected document, and wherein the off-line site visit projection is determined based on a site visit rate for the first geo-block, each of the at least one geo-block being a geographical region having one or more natural boundaries.

15. The method of claim 11, wherein the location features include identification of a geo-block and wherein the off-line site visit projection is determined using data associated with the geo-block, the geo-block being a geographical region having one or more natural boundaries.

16. The method of claim 15, further comprising determining, using the data in the requests database, a ratio of a number of unique mobile devices having visited the geo-block and one or more places associated with the selected document to a number of unique mobile devices having visited the geo-block, and wherein the data associated with the geo-block includes a visitation rate estimated using the ratio.

17. The method of claim 11, wherein determining at least one performance measure for each of a plurality of information documents comprises:

searching the events database to obtain data of impression events associated with each respective document of the plurality of documents and generating the impression-based performance measure for the first document based on data of impression events associated with the first document;

searching the impression events to obtain data of click/call events associated with the second document and generating the click/call-based performance measure for the second document based on the data of impression events associated with the second document and the data of click/call events associated with the second document; and searching the requests database to obtain data of site visits events related to the third document and generating the off-line site-visit-based performance measure for the third document using the data of site visits events.

18. The method of claim 17, further comprising:

dividing mobile devices impressed with the third document into multiple frequency buckets each associated with a range of frequencies with which mobile user are seen via information requests;

determining a site visit rate (SVR) value for each frequency bucket based on the data in the requests database and the data of site visits events;

fitting the SVR values of the multiple frequency buckets to a model function to determine a convergence value for the model function; and wherein the off-line site-visit-based performance measure for the third document is generated using the convergence value.

19. The method of claim 17, further comprising:

receiving panel data packets from a second plurality of mobile devices;

deriving location features from the panel data packets;

annotating panel data in the panel data packets with respective location features to generate annotated panel data sets;

storing the annotated panel data sets in the requests database;

receiving signals indicating impression events from at least some of the second plurality of mobile devices;

storing data extracted from the signals indicating impression events in the events database;

querying the events database for impression data associated with a third plurality of mobile devices that are in the first plurality of mobile devices and in the second plurality of mobile devices;

determining a first number of mobile devices having visited one or more calibration places using panel data sets associated with the third plurality of mobile devices, and a second number of mobile devices having visited the one or more calibration places using location features generated for certain requests associated with the third plurality of mobile devices; and determining a calibration multiplier using the first number and the second number.

20. The method of claim 19, wherein the off-line site-visit-based performance measure for the third document is determined using the calibration multiplier.

* * * * *

UNITED STATES PATENT AND TRADEMARK OFFICE
CERTIFICATE OF CORRECTION

PATENT NO. : 10,762,141 B2
APPLICATION NO. : 15/919197
DATED : September 1, 2020
INVENTOR(S) : Liang et al.

It is certified that error appears in the above-identified patent and that said Letters Patent is hereby corrected as shown below:

In the Claims

Claim 11, Column 24, Line 32, please delete "memory devices" and insert --mobile devices--.

Signed and Sealed this
Third Day of November, 2020

Andrei Iancu
*Director of the United States Patent and Trademark Office*